US011224168B1

(12) United States Patent
Bremmer

(10) Patent No.: US 11,224,168 B1
(45) Date of Patent: Jan. 18, 2022

(54) HANDHELD HARVESTER APPARATUS

(71) Applicant: Martin Bremmer, Venango, NE (US)

(72) Inventor: Martin Bremmer, Venango, NE (US)

( * ) Notice: Subject to any disclaimer, the term of this patent is extended or adjusted under 35 U.S.C. 154(b) by 324 days.

(21) Appl. No.: 16/393,122

(22) Filed: Apr. 24, 2019

(51) Int. Cl.
*A01F 5/00* (2006.01)
*A01F 12/44* (2006.01)
*A01F 12/18* (2006.01)
*A01D 45/30* (2006.01)
*A01F 11/06* (2006.01)
*A01F 11/00* (2006.01)
*A01F 12/00* (2006.01)

(52) U.S. Cl.
CPC ............. *A01F 5/00* (2013.01); *A01F 12/18* (2013.01); *A01F 12/444* (2013.01); *A01F 12/446* (2013.01); *A01D 45/30* (2013.01); *A01F 11/00* (2013.01); *A01F 11/06* (2013.01); *A01F 12/00* (2013.01)

(58) Field of Classification Search
CPC ........ A01F 5/00; A01F 12/446; A01F 12/444; A01F 12/18; A01F 12/00; A01F 11/00; A01F 11/06; A01D 45/30
See application file for complete search history.

(56) References Cited

U.S. PATENT DOCUMENTS

| 315,710 A | 4/1885 | Bruce | |
|---|---|---|---|
| 1,158,304 A * | 10/1915 | Schaub | B01F 1/0022 422/269 |
| 1,662,736 A | 3/1928 | Browning | |
| 1,910,357 A * | 5/1933 | George | A01F 7/00 460/65 |
| 2,169,527 A | 8/1939 | Haynes | |
| 2,236,002 A | 3/1941 | Lederer | |

(Continued)

FOREIGN PATENT DOCUMENTS

| CN | 107484505 A | * | 12/2017 | ............. A01F 11/00 |
|---|---|---|---|---|
| EP | 0316969 B1 | | 11/1994 | |

(Continued)

OTHER PUBLICATIONS

Gode, The minibatt—taking sample cereal—combine harvester, Printed online: http://www.gode.fr/uk/default.asp?rub=2&srub=18 &ssrub=33&langue=uk#, Print Date Feb. 10, 2014, 2 pages.

*Primary Examiner* — Arpad Fabian-Kovacs
(74) *Attorney, Agent, or Firm* — Suiter Swantz pc llo

(57) ABSTRACT

A handheld harvester apparatus may include a threshing assembly and a screening assembly within a housing. The threshing assembly may include a threshing drum with a plurality of blades coupled to a first axle. The plurality of blades may include a set of teeth configured to strip a plurality of seeds and plant material from a plant. The screening assembly may include a paddle assembly configured to receive the plurality of seeds and plant material from the threshing assembly, the paddle assembly including a plurality of paddles coupled to a second axle. The screening assembly may include a screen assembly positioned beneath the paddle assembly, the screen assembly including a plurality of pass-through apertures configured to define a threshold for the plurality of seeds. The screening assembly may include a collection chamber configured to receive any of the plurality of seeds that exit the plurality of pass-through apertures.

20 Claims, 23 Drawing Sheets

(56) References Cited

U.S. PATENT DOCUMENTS

| | | |
|---|---|---|
| 2,245,081 A | 6/1941 | Pierce |
| 2,499,047 A | 2/1950 | Wilkins |
| 2,760,492 A | 8/1956 | Allen |
| 2,853,845 A | 9/1958 | Smith |
| 3,124,139 A | 3/1964 | Stokland |
| 3,423,910 A | 1/1969 | Shimamoto et al. |
| 3,425,423 A | 2/1969 | McKenzie |
| 4,313,449 A | 2/1982 | Silva |
| 4,417,593 A | 11/1983 | Brehon |
| 4,458,697 A | 7/1984 | James |
| 4,578,934 A | 4/1986 | West et al. |
| 4,738,087 A | 4/1988 | Lundahl |
| 4,951,453 A | 8/1990 | Klinner |
| 5,036,653 A | 8/1991 | Klinner |
| 5,041,058 A | 8/1991 | Quimby |
| 5,106,340 A | 4/1992 | Quimby |
| 5,287,685 A | 2/1994 | Morgan |
| 5,389,038 A | 2/1995 | Shelbourne et al. |
| 5,419,107 A | 5/1995 | Shelbourne et al. |
| 5,569,079 A | 10/1996 | Ryden et al. |
| 5,678,397 A | 10/1997 | Shelbourne et al. |
| 5,851,145 A | 12/1998 | Lohse |
| 5,878,970 A | 3/1999 | Leeb |
| 6,315,659 B1 | 11/2001 | Shelbourne |
| 6,361,435 B1 | 3/2002 | Yamamoto et al. |
| 6,640,530 B1 | 11/2003 | Arbuckle |
| 7,108,601 B2 * | 9/2006 | King .................. A01F 5/00 460/46 |
| 7,524,242 B2 | 4/2009 | Stukenholtz et al. |
| 7,681,383 B2 | 3/2010 | Argetsinger et al. |
| 8,869,498 B1 * | 10/2014 | Bremmer ............ A01F 5/00 56/126 |
| 2006/0046801 A1 | 3/2006 | Argetsinger et al. |
| 2016/0024768 A1 * | 1/2016 | Jeremie ............. E03C 1/086 134/32 |

FOREIGN PATENT DOCUMENTS

| | | |
|---|---|---|
| WO | 2000008915 A1 | 1/2002 |
| WO | 2005112605 A1 | 12/2005 |

* cited by examiner

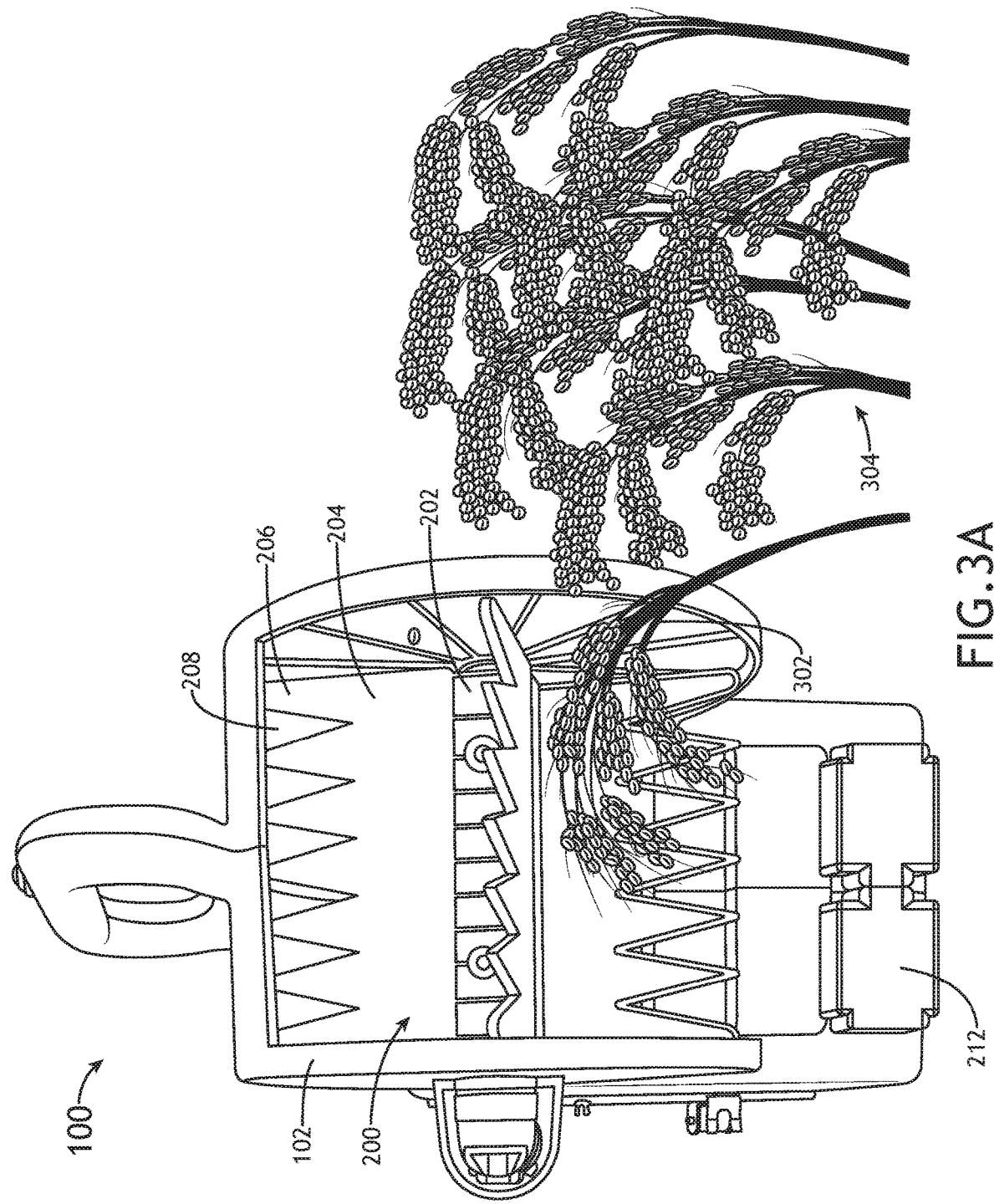

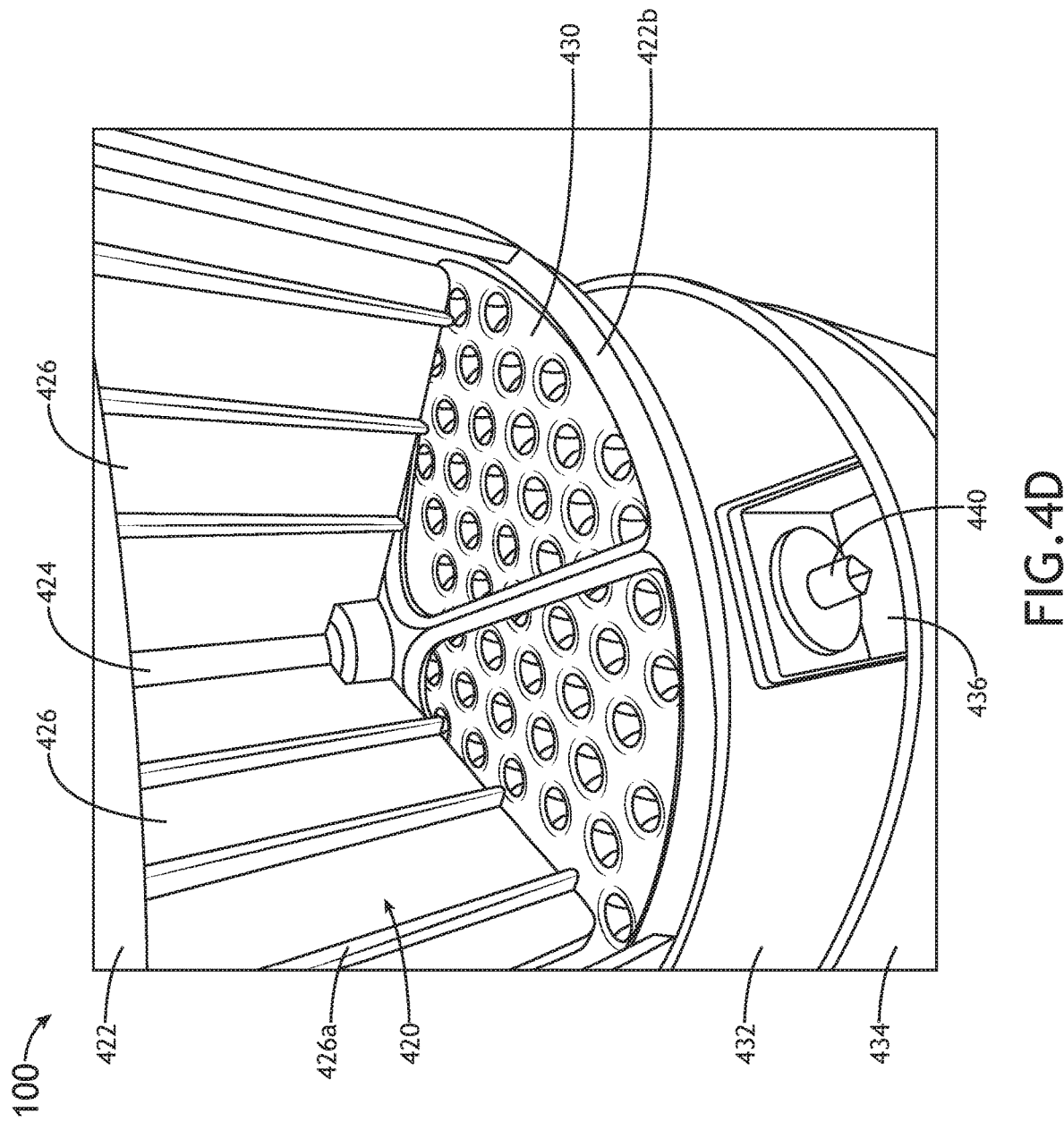

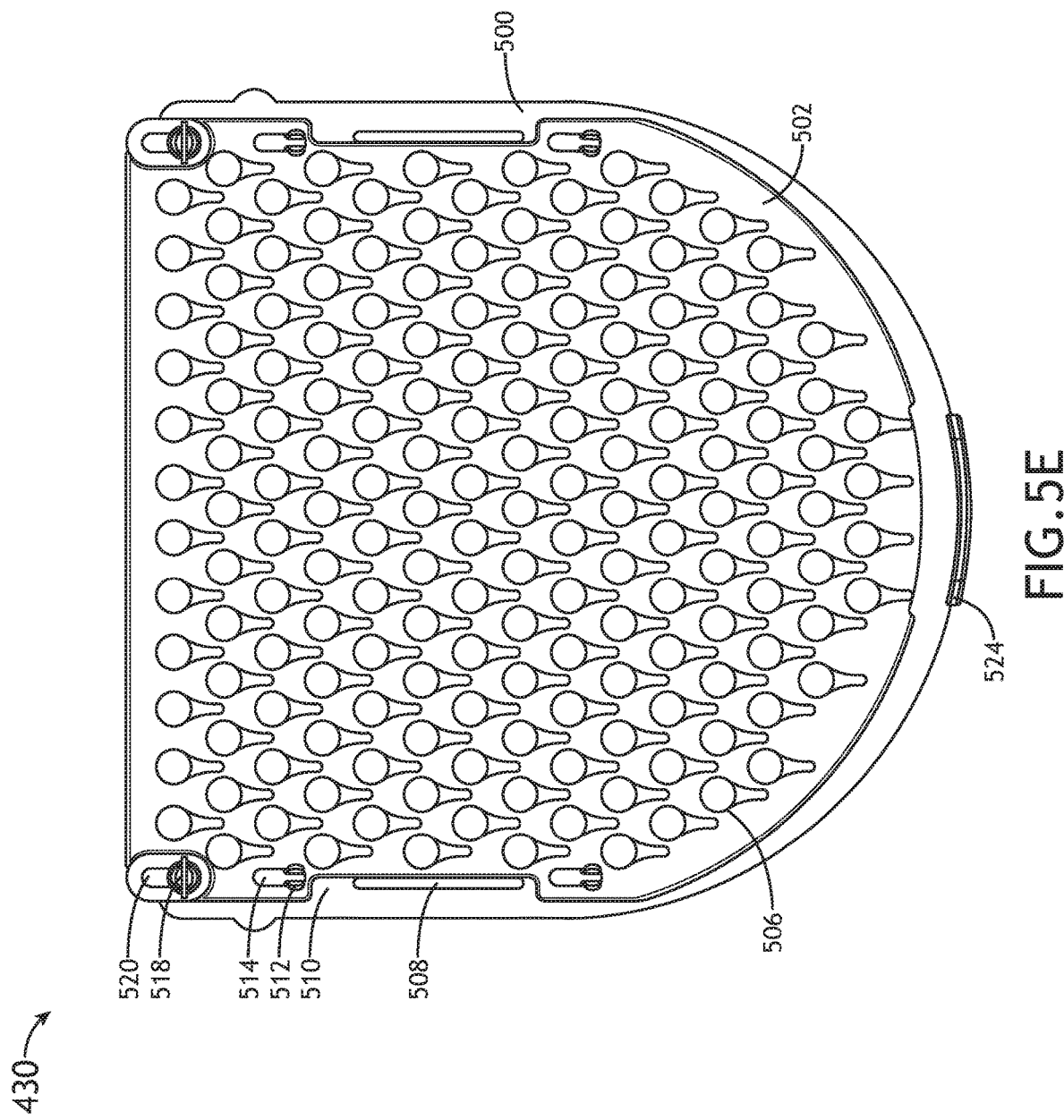

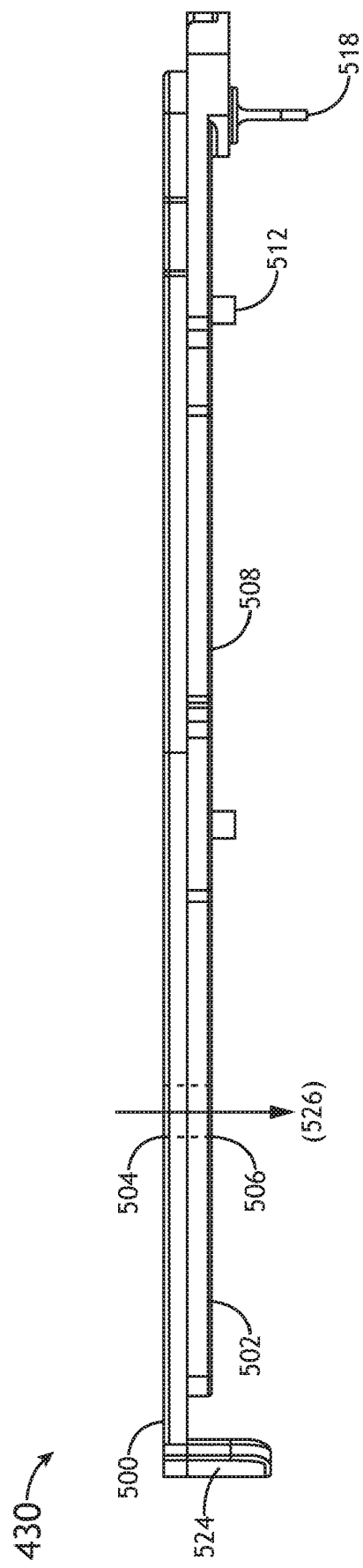

HANDHELD HARVESTER APPARATUS

TECHNICAL FIELD

The present invention generally relates to the field of agricultural equipment and, in particular, to a handheld harvester apparatus.

BACKGROUND

When growing grain and seed crops, it is important to determine moisture levels of the grain and seed crop in order to assess crop health and optimize the timing of harvesting. Known systems and methods for determining a moisture level of grain and seed crops within a planted field may require taking several samples in order to obtain an accurate picture of the moisture levels of the entire planted field.

For example, where the planted field is a large field, a farmer may be required to travel to a different location around the planted field while transporting heavy equipment and machinery to obtain the several samples. For example, a farmer may have to use a combine to take the several samples in different locations around the planted field. In this regard, the obtaining of the several samples may be inefficient. By way of another example, where the planted field is a small field, it may not be economical or practical to use large and complex agricultural machinery to handle a smaller scale harvest.

As such, it would be desirable to provide an apparatus that addresses the shortcomings of the previous approaches listed above.

SUMMARY

A handheld harvester apparatus is disclosed. The handheld harvester apparatus may include a threshing assembly. The threshing assembly may include a threshing drum configured to rotate about a first axle. The threshing drum may include a plurality of blades coupled to the first axle. A blade of the plurality of blades may include a set of teeth configured to strip a plurality of seeds and plant material from a head of a plant. The handheld harvester apparatus may include a screening assembly. The screening assembly may include a paddle assembly configured to receive the plurality of seeds and plant material from the threshing assembly. The paddle assembly may be configured to rotate about a second axle. The paddle assembly may include a plurality of paddles coupled to the second axle. The screening assembly may include a screen assembly positioned beneath the paddle assembly. The screen assembly may include a top screen including a first plurality of apertures. The top screen may be configured to receive the plurality of seeds from the paddle assembly. The screen assembly may include a bottom screen including a second plurality of apertures. The bottom screen may be positioned beneath the top screen. The top screen may be configured to translate relative to the bottom screen. The screen assembly may include a plurality of pass-through apertures configured to define a threshold for at least one of a size or shape of a seed of the plurality of seeds. A pass-through aperture of the plurality of pass-through apertures may be defined by an overlapping top aperture of the first plurality of apertures and a bottom aperture of the second plurality of apertures. The screening assembly may include a collection chamber positioned beneath the screen assembly. The collection chamber may be configured to receive a seed of the plurality of seeds that exits a pass-through aperture of the plurality of pass-through apertures. The handheld harvester apparatus may include a housing configured to house at least a portion of the threshing assembly and at least a portion of the screening assembly.

A handheld harvester apparatus is disclosed. The handheld harvester apparatus may include a threshing assembly. The threshing assembly may include a threshing drum configured to rotate about a first axle. The threshing drum may include a plurality of blades coupled to the first axle. A blade of the plurality of blades may include a set of teeth configured to strip a plurality of seeds and plant material from a head of a plant. The handheld harvester apparatus may include a screening assembly. The screening assembly may include a paddle assembly configured to receive the plurality of seeds and plant material from the threshing assembly. The paddle assembly may be configured to rotate about a second axle. The paddle assembly may include a plurality of paddles coupled to the second axle. The screening assembly may include an exhaust port. The paddle assembly may be configured to eject the plant material out through the exhaust port during rotation of the paddle assembly. The screening assembly may include a screen assembly positioned beneath the paddle assembly. The screen assembly may include a top screen including a first plurality of apertures. The top screen may be configured to receive the plurality of seeds from the paddle assembly. The screen assembly may include a bottom screen including a second plurality of apertures. The bottom screen may be positioned beneath the top screen. The top screen may be configured to translate relative to the bottom screen. The screen assembly may include a plurality of pass-through apertures configured to define a threshold for at least one of a size or shape of a seed of the plurality of seeds. A pass-through aperture of the plurality of pass-through apertures may be defined by an overlapping top aperture of the first plurality of apertures and a bottom aperture of the second plurality of apertures. The handheld harvester apparatus may include a housing configured to house at least a portion of the threshing assembly and at least a portion of the screening assembly.

A screen assembly for a handheld harvester apparatus is disclosed. The screen assembly may include a top screen including a first plurality of apertures. The top screen may be configured to receive a plurality of seeds. The screen assembly may include a bottom screen including a second plurality of apertures. The bottom screen may be positioned beneath the top screen. The top screen may be configured to translate relative to the bottom screen. The screen assembly may include a plurality of pass-through apertures. The plurality of pass-through apertures may be configured to define a threshold for at least one of a size or shape of a seed of the plurality of seeds. A pass-through aperture of the plurality of pass-through apertures may be defined by an overlapping top aperture of the first plurality of apertures and a bottom aperture of the second plurality of apertures. A pass-through aperture of the plurality of pass-through apertures may be configured to direct a seed of the plurality of seeds to a collection chamber.

BRIEF DESCRIPTION OF THE DRAWINGS

The numerous advantages of the disclosure may be better understood by those skilled in the art by reference to the accompanying figures in which:

FIG. 3A illustrates an example embodiment of a handheld harvester apparatus threshing grain or seed from a plant or crop, in accordance with one or more embodiments of the present disclosure;

FIG. 4D illustrates a perspective view of a screen assembly of a handheld harvester apparatus, in accordance with one or more embodiments of the present disclosure;

FIG. 5E illustrates a bottom plan view of the screen assembly in a size and shape-restricted alignment, in accordance with one or more embodiments of the present disclosure;

FIG. 5H illustrates a side elevation view of the screen assembly in a size and shape-restricted alignment, in accordance with one or more embodiments of the present disclosure.

DETAILED DESCRIPTION OF THE INVENTION

Reference will now be made in detail to the subject matter disclosed, which is illustrated in the accompanying drawings.

FIGS. 1-6 generally illustrate a handheld harvester apparatus, in accordance with one or more embodiments of the present disclosure.

Broadly, embodiments of the present disclosure are directed to a handheld harvester apparatus. More particularly, embodiments of the present disclosure are directed to a handheld harvester apparatus configured for operation by a single operator to collect grain or seed and separate the grain or seed from unwanted plant material at a variety of locations.

Figure 1:
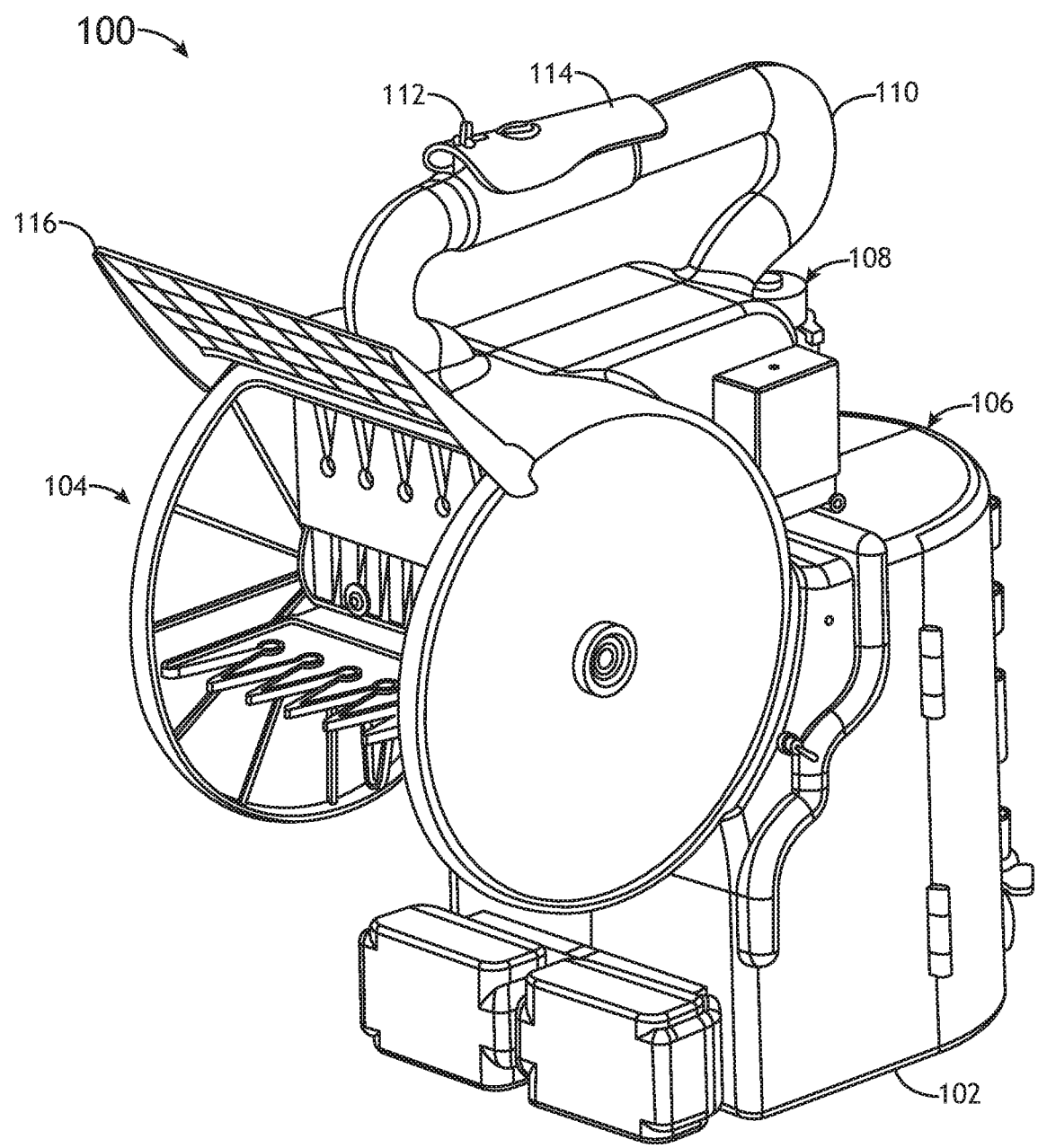
FIG. 1 illustrates a perspective view of a handheld harvester apparatus, in accordance with one or more embodiments of the present disclosure.

FIG. 1 illustrates a handheld harvester apparatus 100, in accordance with one or more embodiments of the present disclosure. It is noted herein that "handheld harvester apparatus 100," "handheld harvester 100," "harvester 100," "harvester apparatus 100," and "apparatus 100" may be considered equivalent, for purposes of the present disclosure.

The harvester 100 may be dimensioned to allow for handheld operation. For example, the harvester 100 may have a total weight, size, and shape such that a single operator may operate the harvester 100 to harvest crops in a field. The harvester 100 may be suitable for taking samples at a variety of locations. For example, the harvester 100 may be suitable for taking samples in a large field. For example, the harvester 100 may be suitable for taking samples in a small field (e.g., garden).

The harvester 100 may include a housing 102. The housing 102 may be constructed from one or more sections. Where the housing 102 is constructed from multiple sections, the sections may be coupled together via one or more couplers including, but are not limited to, one or more interlocking assemblies (e.g., a tongue-and-groove assembly, a tab-and-slot assembly, a plunger-and-hole assembly, a friction clip assembly, a latching assembly, or the like), one or more fasteners, an adhesive, or the like.

The housing 102 may include a section configured to house a threshing assembly 104, where the threshing assembly 104 includes one or more components configured to harvest grain or seed (and, potentially, unwanted plant matter). It is noted herein the harvester 100 may be suitable for a variety of grain or seed types. For example, the harvester 100 may be used to harvest one or more of wheat, oats, barley, millet, and/or any other grain- or seed-based crop known in the art. Although embodiments of the present disclosure may be directed to "grain" or to "seed," it is noted herein that the terms "grain" and "seed" may be considered equivalent, for purposes of the present disclosure.

The housing 102 may include a section configured to house a screening assembly 106, where the screening assembly 106 includes one or more grain- or seed-sorting components configured to sort harvested grain or seed from the threshing assembly and separate unwanted plant matter from the harvested grain or seed.

The housing 102 may include a section configured to house one or more electrical components 108. For instance, the one or more electrical components 108 may be configured to control and/or drive one or more harvesting components within the threshing assembly 104 and/or one or more grain- or seed-sorting components within the screening assembly 106.

The harvester 100 may include a handle 110 for hauling and/or carrying the harvester 100. The handle 110 may include a toggle 112 (e.g., button, switch, lever, trigger, or the like). For example, the toggle 112 may control power flow (e.g., provide to and/or remove from) throughout the harvester 100. The handle 110 may include one or more safety mechanisms 114 configured to prevent the toggle 112 from being inadvertently activated. For example, the one or more safety mechanisms 114 may include, but are not limited to, a locking assembly, a secondary safety toggle, or the like.

The harvester 100 may include a deflector panel or shield 116. For example, the deflector panel or shield 116 may guide plants into the threshing assembly 104 during the harvesting of the grain or seed and unwanted plant matter. By way of another example, the deflector panel or shield 116 may protect a user from flying grain or seed during the harvesting of the grain or seed.

The entire harvester 100 and/or one or more components of the harvester 100 (e.g., the housing 102 or one or more sections of the housing 102, the threshing assembly 104, the screening assembly 106, the handle 110, the deflector panel or shield 116, or the like) may be fabricated from any plastic or metal known in the art.

Figure 2A:
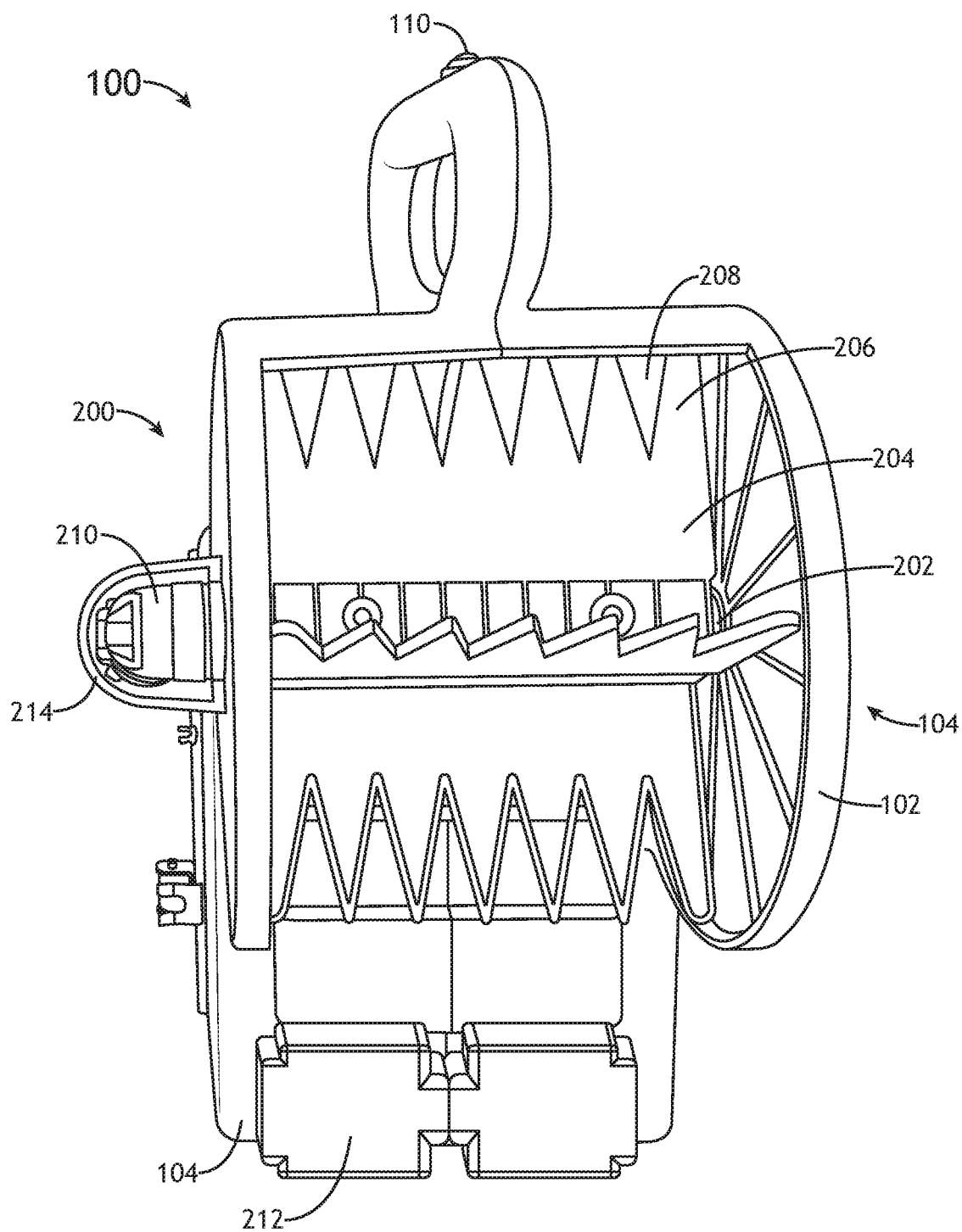
FIG. 2A illustrates a side rear view of a threshing housing of a handheld harvester apparatus, in accordance with one or more embodiments of the present disclosure.
Figure 2B:
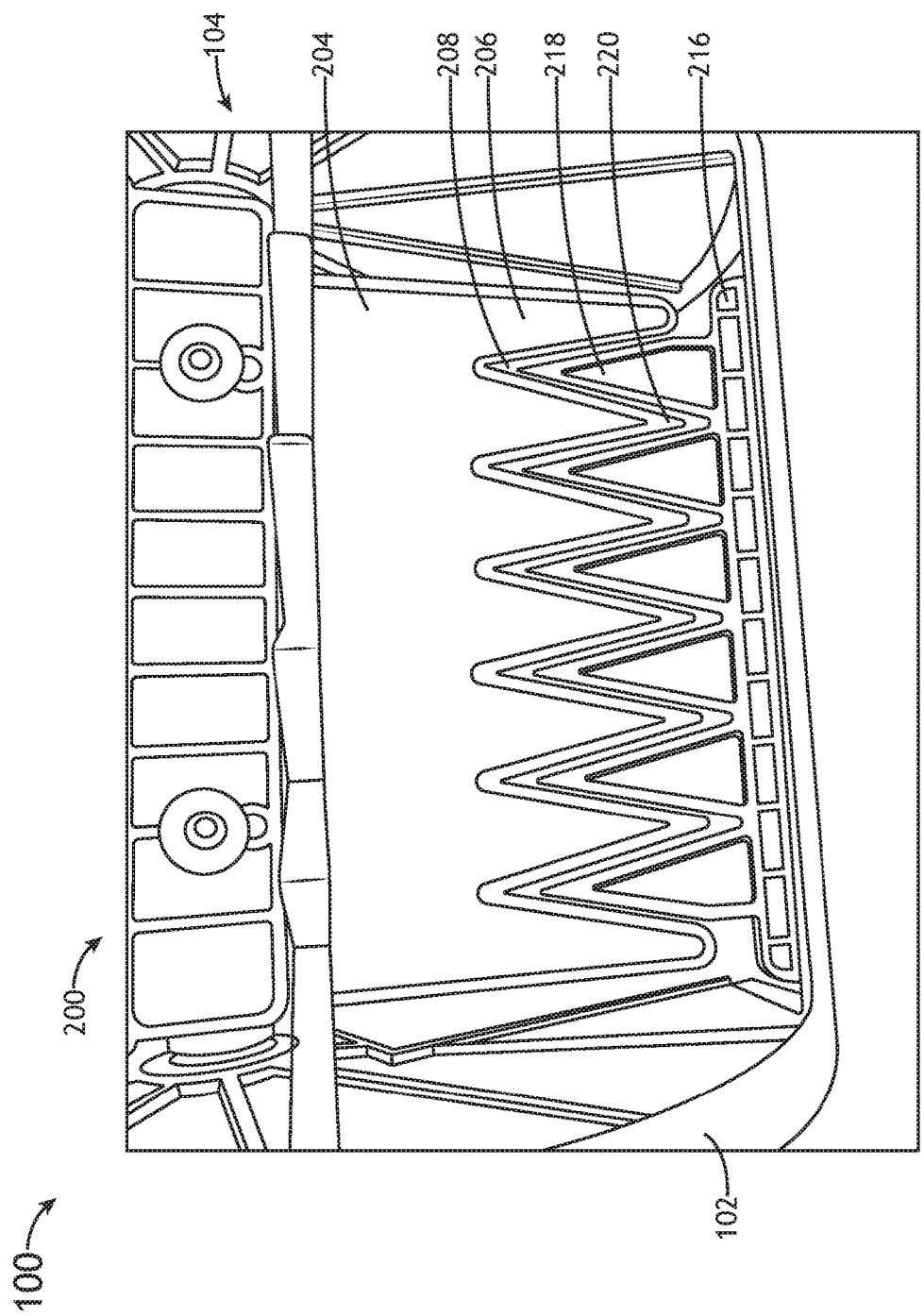
FIG. 2B illustrates a threshing housing of a handheld harvester apparatus, in accordance with one or more embodiments of the present disclosure.
Figure 2C:
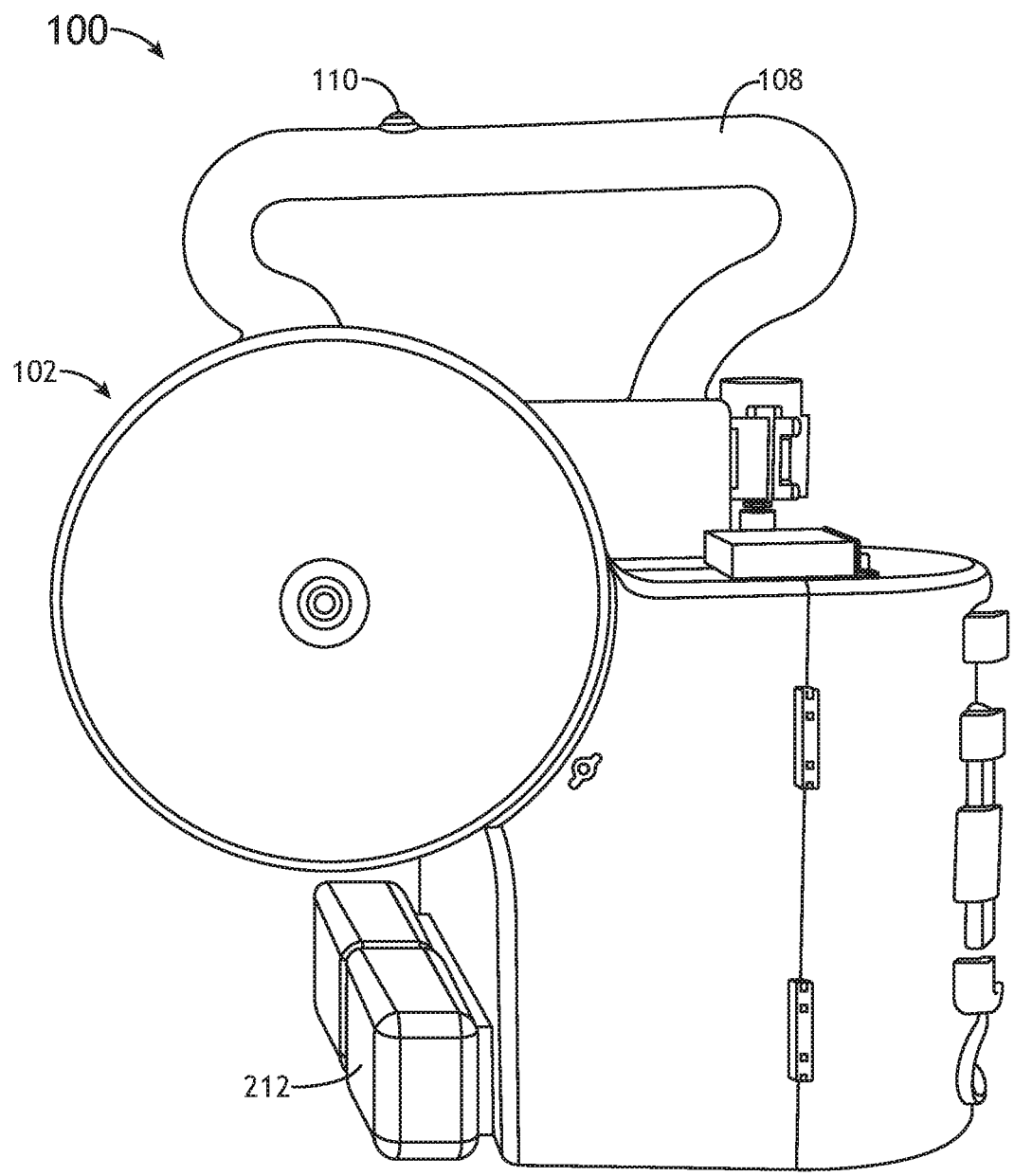
FIG. 2C illustrates a side plan view of a handheld harvester apparatus, in accordance with one or more embodiments of the present disclosure.

FIGS. 2A-2C generally illustrate the threshing assembly 104 of the harvester 100, in accordance with one or more embodiments of the present disclosure.

The threshing assembly 104 may include a threshing drum 200. The threshing drum 200 may be configured to rotate about an axis through an axle 202. For example, the direction of rotation may be approximately perpendicular to a head of a plant.

The threshing drum 200 may include one or more blades 204. At least some of the one or more blades 204 may include a set of teeth 206. For example, the set of teeth 206 may be distributed in one or several different rows on the blade 204. For instance, the set of teeth 206 may be aligned within a single row and attached to the blade 204. In addition, multiple rows of the set of teeth 206 may be coupled to the blade 204 in either aligned or offset arrangements.

The set of teeth 206 and/or any gaps 208 between adjacent teeth may be sized, spaced, and/or shaped to at least partially surround a head of a plant. The set of teeth 206 may include teeth with a cross-section of any size and/or shape having any number of curved or straight sides, up to an N number of sides (e.g., the cross-section may be up to an N-sided polygon). For example, the set of teeth 206 may include teeth having a substantially triangular shape. By way of another example, the set of teeth 206 may include teeth that are long and narrow. For instance, a tooth of the set of teeth 206 may range from 1.5 inches by 2.5 inches up to 3.0 inches by 8.0 inches. It is noted herein, however, that the forgoing dimensions are intended to be exemplary only and not intended to be limiting, and those having ordinary skill in the art will understand that additional dimensions and configurations of teeth are possible without departing from the scope of this disclosure. Therefore, the above description should not be interpreted as a limitation on the present disclosure but merely an illustration.

Rotation of the threshing drum 200 may rotate the one or more blades 204 about the axis through the axle 202. The one or more blades 204 may be configured to strip grain or seed from a head of a plant. For example, the one or more blades 204 may be removable from the threshing drum 200 and swappable with other blades 204 to accommodate different crop types. By way of another example, the threshing drum 200 may be removable from the harvester 100 and swappable with other threshing drums 204 to accommodate different crop types.

The one or more blades 204 may be configured to point forward and away from the harvester 100 when removing seeds from a head of a plant. For example, the set of teeth 206 may be angled in the direction of rotation of the threshing drum 200. For instance, angling the set of teeth 206 may result in the set of teeth 206 cupping the grain or seed to prevent the grain or seed from falling out of the threshing drum 200 before reaching the screening assembly 106 and the grain- or seed-sorting components therein. By way of another example, the head of a plant may lodge within the gap 208 (e.g., at least a portion of the total depth of the set of teeth 206) of the long and narrow set of teeth 206, such that the head of the plant may be surrounded before the set of teeth 206 remove seeds from the head of the plant in a stripping action. In this regard, the set of teeth 206 may be configured to minimize the amount of plant material (e.g., parts of a plant other than the grain or seed) that is picked up by (or enters) the harvester 100. For example, the stripping action of the set of teeth 206 may help to minimize the amount of plant material that is stripped from the plant is picked up by (or enters) the harvester 100.

Figure 3B:
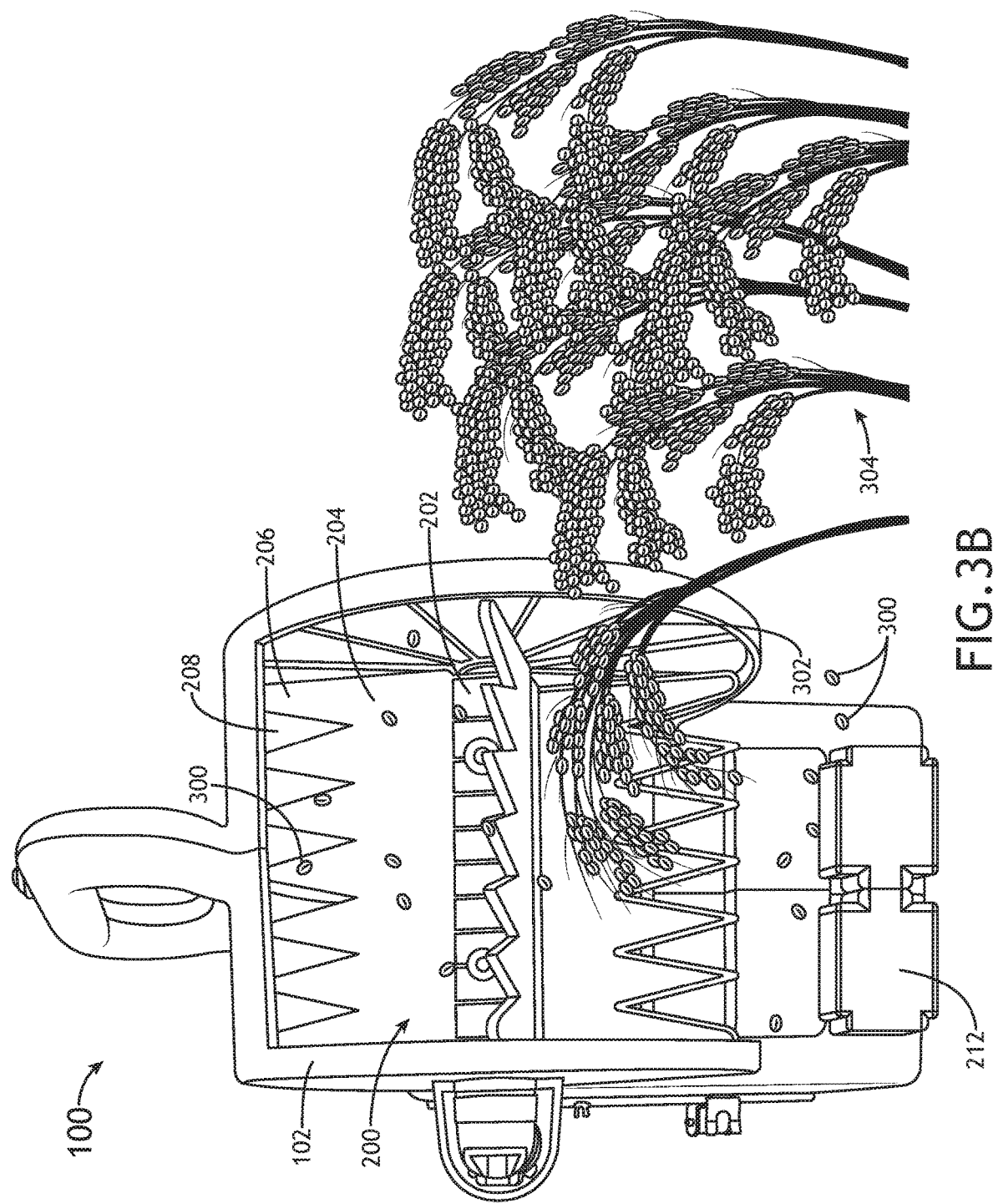
FIG. 3B illustrates an example embodiment of a handheld harvester apparatus threshing grain or seed from a plant or crop, in accordance with one or more embodiments of the present disclosure.
Figure 3C:
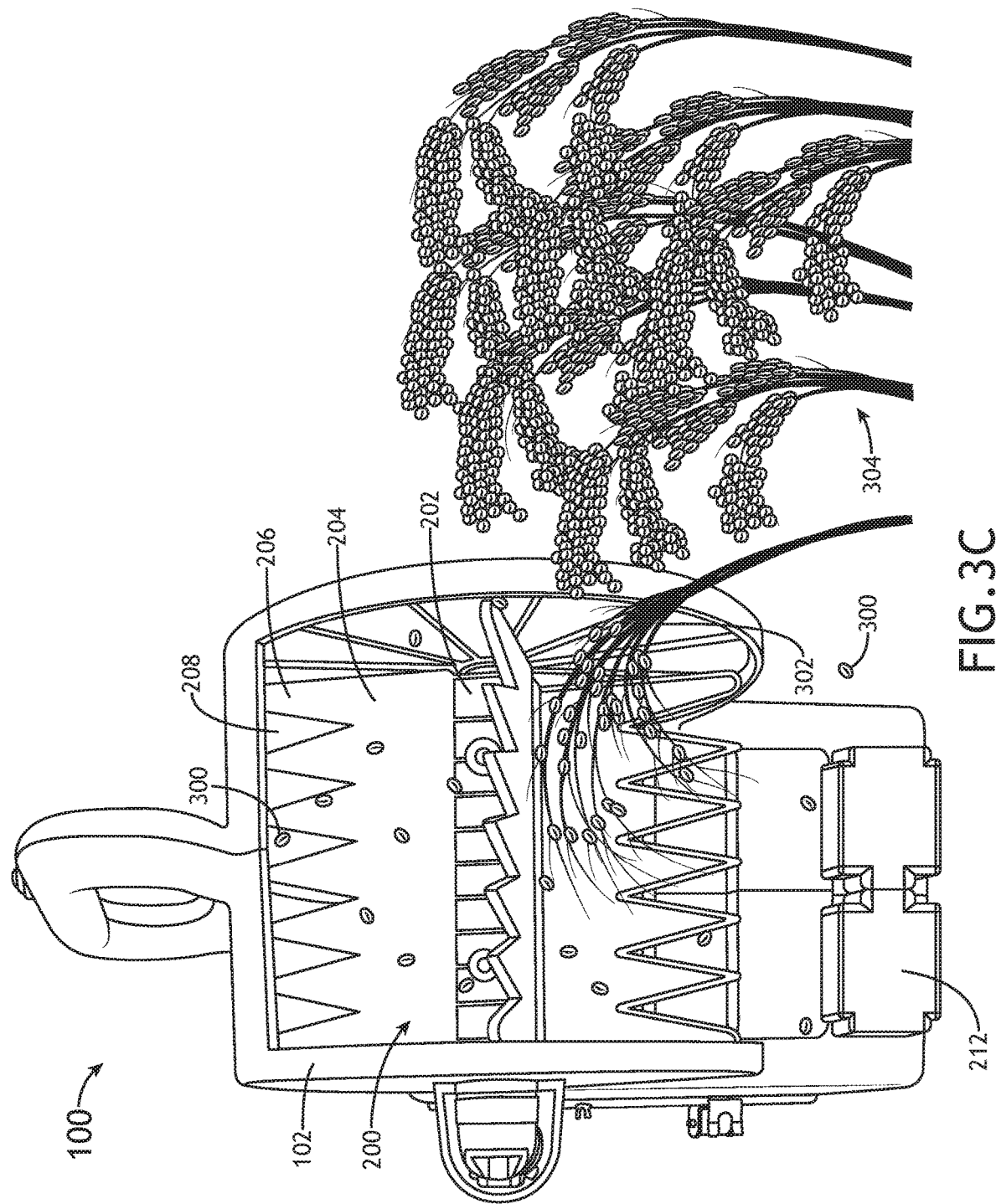
FIG. 3C illustrates an example embodiment of a handheld harvester apparatus threshing grain or seed from a plant or crop, in accordance with one or more embodiments of the present disclosure.
Figure 4A:
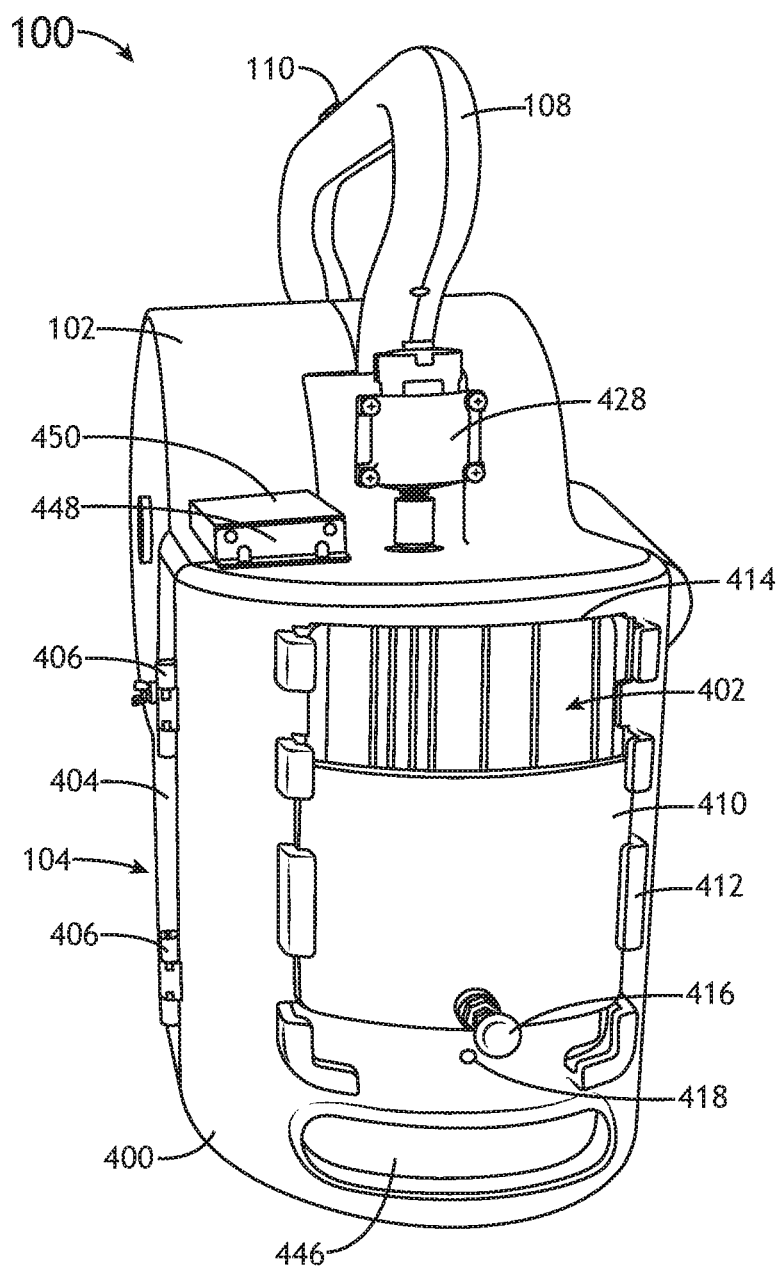
FIG. 4A illustrates a perspective view of a screen assembly of a handheld harvester apparatus, in accordance with one or more embodiments of the present disclosure.
Figure 4B:
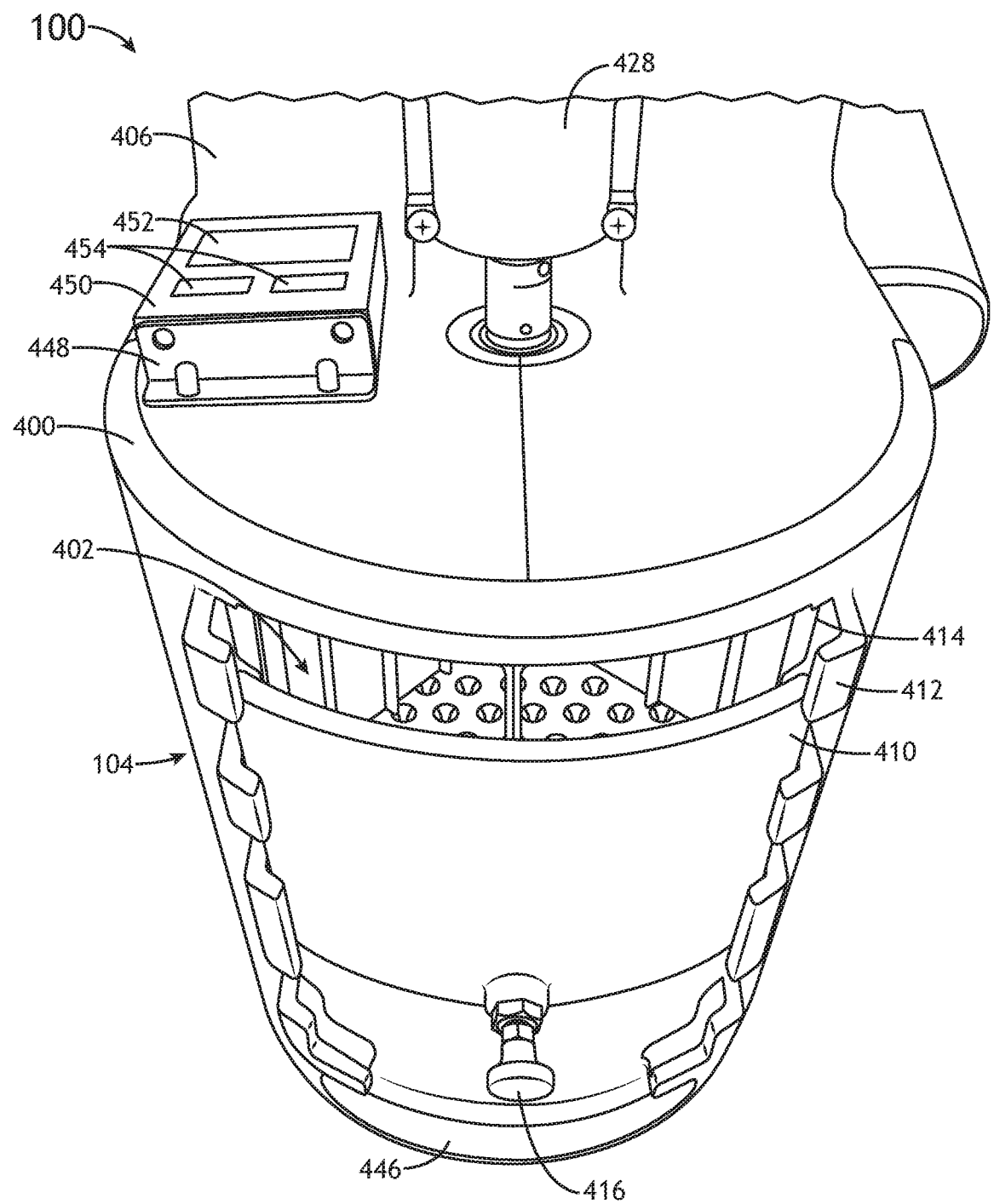
FIG. 4B illustrates a perspective view of a screen assembly of a handheld harvester apparatus, in accordance with one or more embodiments of the present disclosure.
Figure 4C:
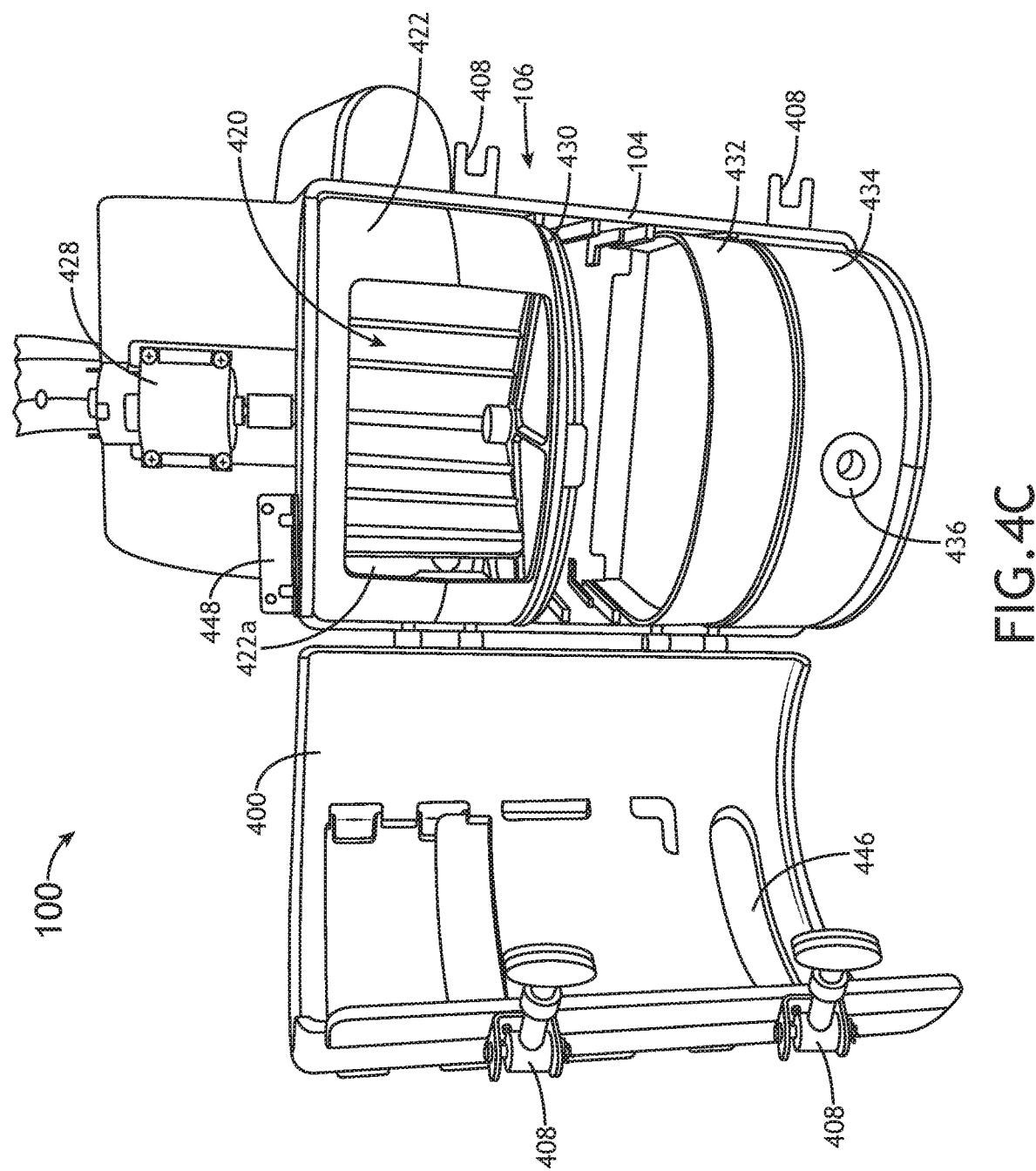
FIG. 4C illustrates a perspective view of a screen assembly of a handheld harvester apparatus, in accordance with one or more embodiments of the present disclosure.
Figure 4E:
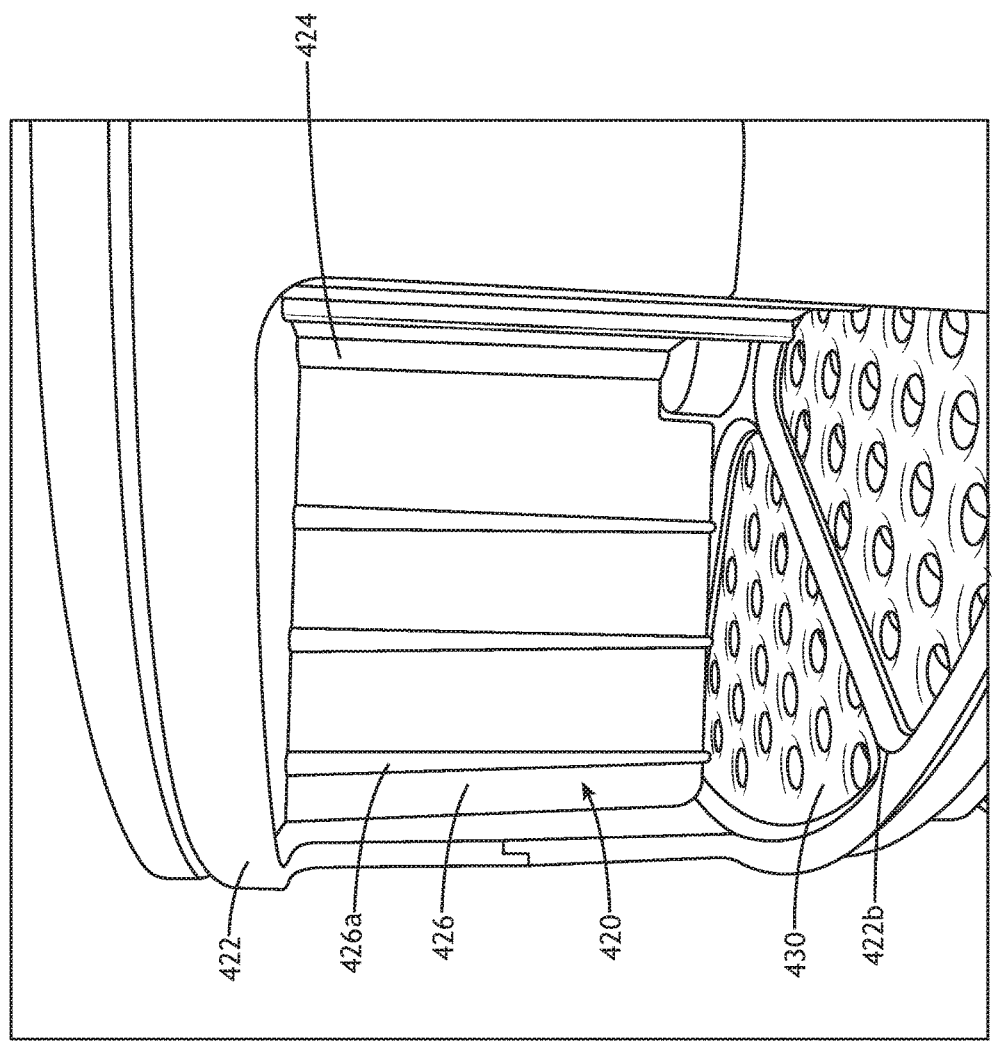
FIG. 4E illustrates a perspective view of a screen assembly of a handheld harvester apparatus, in accordance with one or more embodiments of the present disclosure.
Figure 4F:
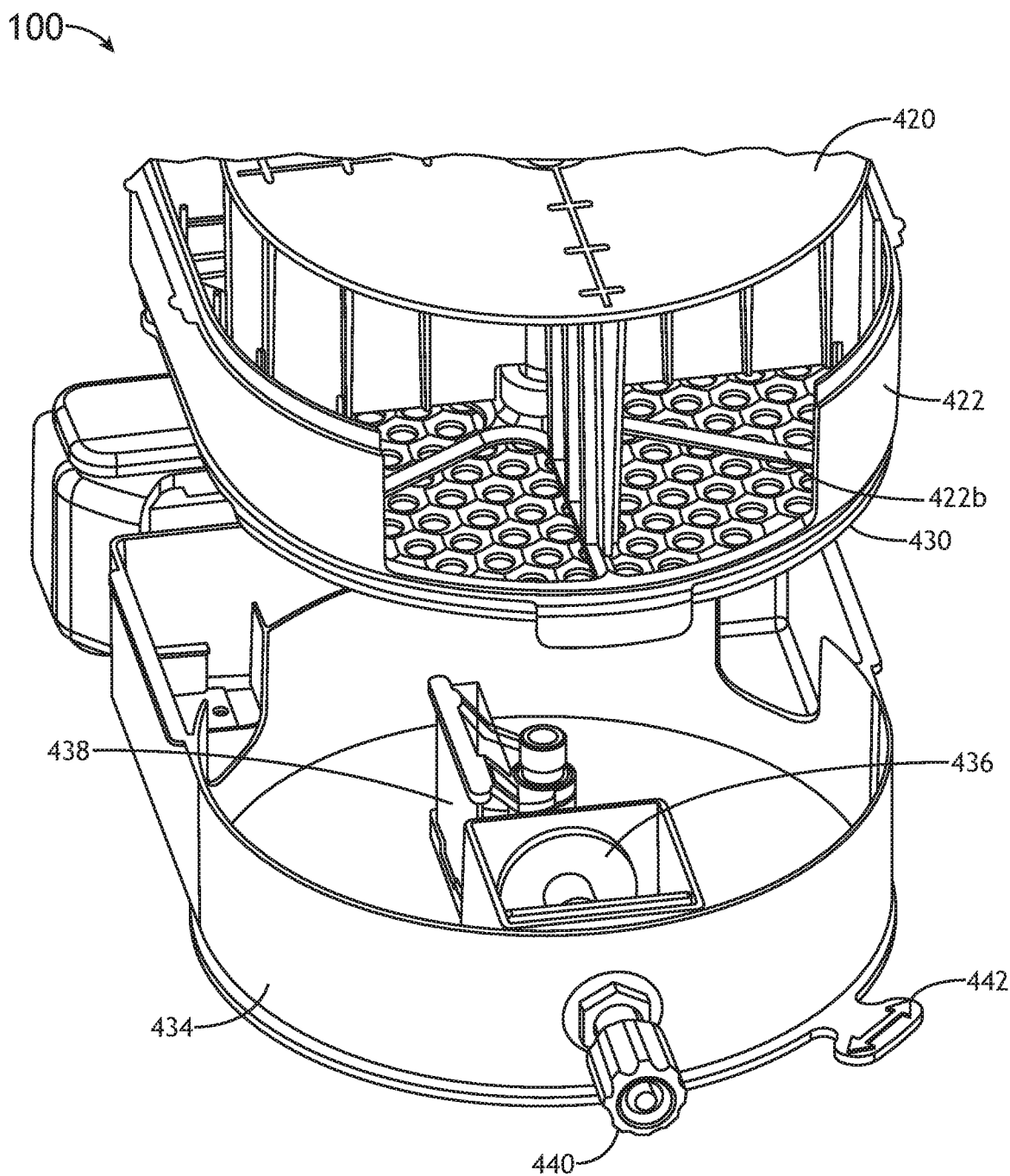
FIG. 4F illustrates an exploded perspective view of a screen assembly of a handheld harvester apparatus, in accordance with one or more embodiments of the present disclosure.
Figure 4G:
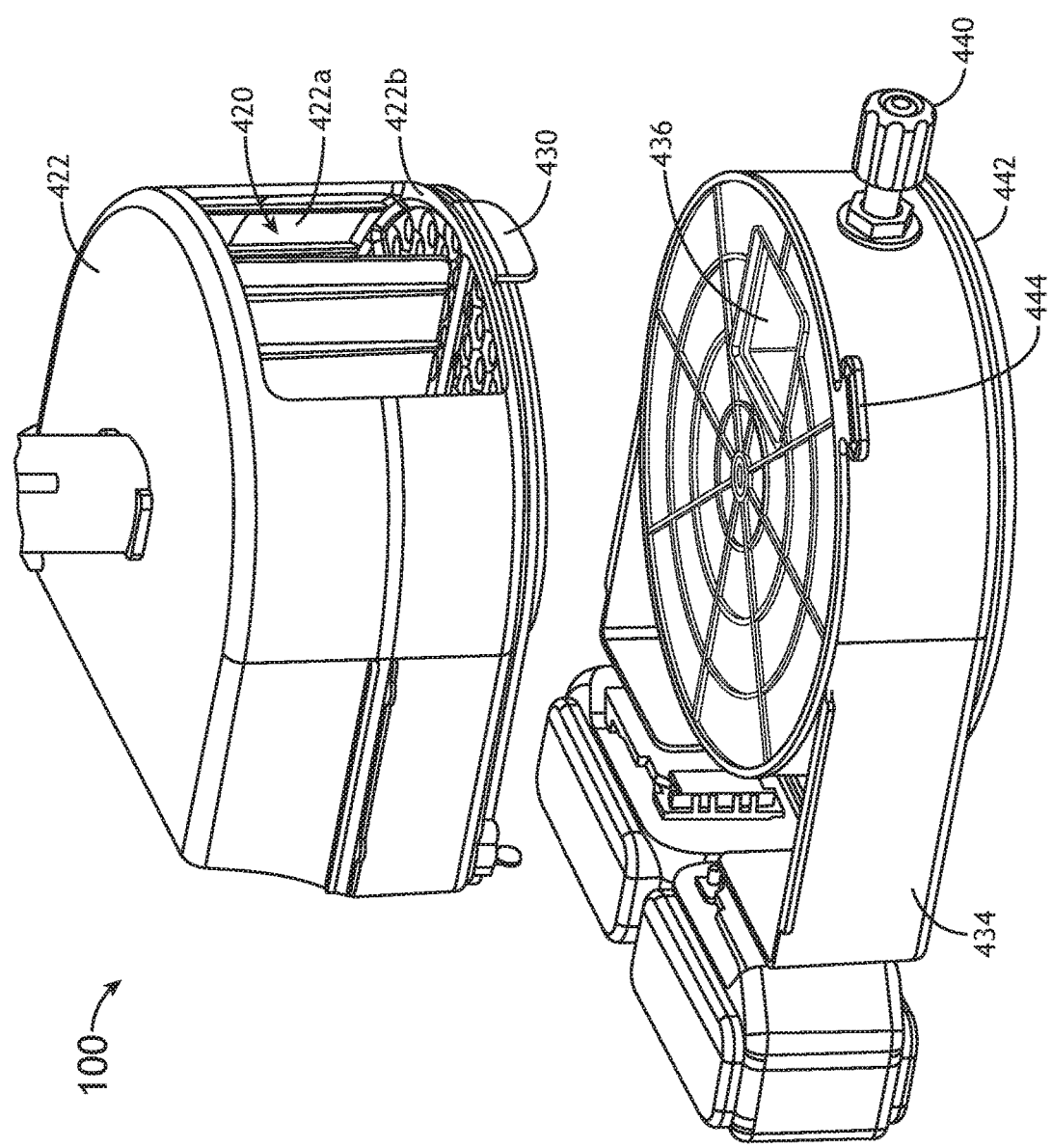
FIG. 4G illustrates an exploded perspective view of a screen assembly of a handheld harvester apparatus, in accordance with one or more embodiments of the present disclosure.

FIGS. 3A-3C generally illustrate an environment in which the harvester 100 is configured to operate, in accordance with one or more embodiments of the present disclosure. As illustrated in FIG. 3A, the harvester 100 is just beginning to remove grain or seed 300 from a head 302 of a plant 304. In this initial stage, the grain or seed 300 are mostly intact on the head 302 of the plant 304 and have not been removed yet. As illustrated in FIG. 3B, seed 300 removal has begun and the threshing drum 200 has begun to strip some of the grain or seed 300 from the head 302 of the plant 304 and to convey them into the harvester 100. For example, the head 302 of the plant 304 may lodge within the gap 208, allowing the set of teeth 206 of a blade 204 strip the grain or seed as the one or more blades 204 rotate about the axle 202. As illustrated in FIG. 3C, harvesting has continued and most of the grain or seed 300 on the plant 304 have been removed, while leaving the head 302 of the plant 304 mostly intact. It is noted herein that it is possible some pieces of plant material from the plant 304 may also be removed during the harvesting process, although the threshing drum 200 is configured to minimize the amount of plant 304 material that is picked up or enters into the harvester 100. However, it is noted herein the harvester 100 will effectively separate the plant 304 material from the grain or seed 300, as the grain or seed 300 and any plant 304 material pass through the harvester 100.

Although embodiments of the present disclosure are directed to the set of teeth 206 being coupled to a blade 204, it is noted herein that the set of teeth 206 may couple directly to the axle 202 (e.g., the set of teeth 206 are not coupled to a definable body between the set of teeth 206 and the axle 202. Therefore, the above description should not be interpreted as a limitation on the present disclosure but merely an illustration.

Referring again to FIGS. 2A-2C, the threshing assembly 104 may include a motor 210 configured to move the threshing drum 200. For example, the motor 210 may be configured to control the speed of rotation of the threshing drum 200. It is noted herein that different speeds of rotation may be necessary depending on one or more of a crop type, a crop condition, an environmental condition, and/or the like during harvesting.

The motor 210 may be electric-powered. For example, the electric-powered motor 210 may be powered by a battery pack 212 onboard the harvester 100. For instance, the apparatus 100 may include one or more battery clips to which one or more battery packs 212 may couple, respectively. It is noted herein that the multiple battery packs 212 may be wired in series as part of a power circuit of the apparatus 100. For example, multiple battery packs 212 in series may result in a proportional increase in the length of run time as compared to when a single battery pack 212 is clipped onto the apparatus 100. By way of another example, the electric-powered motor 210 may be powered by a battery pack coupled to a user. By way of another example, the electric-powered motor 210 may be powered by a wired power cable.

The motor 210 may be controlled via the toggle 112 in the handle 110. The motor 210 may be protected by a cover 214 of the housing 102. For example, the cover 214 may be coupled to the housing 102 proximate to the motor 210. By way of another example, the cover 214 may be integrated (e.g., a single component with) a section of the housing 102. It is noted herein, however, that the motor 210 may be exposed.

Although embodiments of the present disclosure are directed to the harvester 100, it is noted herein that the threshing drum 200 may be hand-powered by the user. Therefore, the above description should not be interpreted as a limitation on the present disclosure but merely an illustration.

The threshing assembly 104 may include one or more stationary blades 216. At least some of the one or more blades 216 may include a set of teeth 218. For example, the set of teeth 218 may be distributed in one or several different rows on the stationary blade 216. For instance, the set of teeth 218 may be aligned within a single row and attached to the stationary blade 216. In addition, multiple rows of the set of teeth 218 may be coupled to the stationary blade 216 in either aligned or offset arrangements.

The set of teeth 218 and/or any gaps 220 between adjacent teeth may be sized, spaced, and/or shaped to at least partially surround a head of a plant. The set of teeth 218 may include teeth with a cross-section of any size and/or shape having any number of curved or straight sides, up to an N number of sides (e.g., the cross-section may be up to an N-sided polygon) and/or have any shape known in the art. For example, the set of teeth 218 may include teeth having a substantially triangular shape. By way of another example, the set of teeth 218 may include teeth that are long and narrow. For instance, a tooth of the set of teeth 218 may range from 1.5 inches by 2.5 inches up to 3.0 inches by 8.0 inches. It is noted herein, however, that the forgoing dimensions are intended to be exemplary only and not intended to be limiting, and those having ordinary skill in the art will understand that additional dimensions and configurations of teeth are possible without departing from the scope of this disclosure. Therefore, the above description should not be interpreted as a limitation on the present disclosure but merely an illustration.

The sets of teeth 206 of the one or more blades 204 may be configured to pass through the gaps 220 within the sets of teeth 218 of the one or more stationary blades 216 as the one or more blades 204 rotate past the one or more stationary blades 216 (e.g., about an axis through the axle 202). It is noted herein that passing the sets of teeth 206 of the one or more blades 204 through the gaps 220 within the sets of teeth 218 may serve to remove unwanted plant material from the sets of teeth 206 and/or further separate the grain or seed from the plant material.

FIGS. 4A-4H generally illustrates the screening assembly 106 of the harvester apparatus 100, in accordance with one or more embodiments of the present disclosure.

The screening assembly 106 may be housed behind a cover 400 of the housing 102. The cover 400 may be opened to provide access to a cavity 402 defined within the housing 102, where the cavity 402 houses one or more components of the screening assembly 106. For example, the cover 400 may be a door coupled to a section 404 of the housing 102 via one or more hinges 406. By way of another example, the cover 400 may be coupled to the section 404 of the housing 102 via one or more couplers 408 including, but are not limited to, one or more interlocking assemblies (e.g., as described throughout the present disclosure), one or more fasteners, an adhesive, or the like. For instance, the cover 400 and the section 404 of the housing 102 may be coupled together via a latching assembly 408.

The cavity 402 may include any number of interior sidewalls, up to an N number of interior sidewalls. For example, the cavity 402 may be circular, including a single partial interior sidewall. By way of another example, the cavity 402 may be rectangular, including three interior sidewalls.

The cover 400 may include an exhaust door 410. The exhaust door 410 may be inserted and configured to translate within a set of grooves or channels 412. It is noted herein, however, that the exhaust door may be coupled to the cover 400 in any manner as described with respect to the coupling of the cover 400 and the rear section 404, above. Therefore, the above description should not be interpreted as a limitation on the present disclosure but merely an illustration.

Translating the exhaust door 410 may open or close an outlet or exhaust port 414. The exhaust port 414 may be located in any suitable location for ejecting unwanted plant material from the harvester 100. For example, the exhaust port 414 may be a cut-out within the cover 400. The exhaust port 414 may be coupled to a discharge spout to facilitate ejection of the unwanted plant material at an increased distance away from the harvester 100.

At least one of the shape and/or the size (e.g., height, width, and/or total area) of the exhaust port 414 may be adjustable. For example, the shape and/or the size of the exhaust port 414 may be set via one or more couplers including, but not limited to, one or more interlocking assemblies (e.g., as described throughout the present disclosure), one or more fasteners, an adhesive, or the like. For instance, the size of the exhaust port 414 may be set via an assembly including a spring-loaded plunger 416 and a set of holes or indents 418 spaced a select distance apart in a surface (e.g., front surface) of the cover 400.

Although embodiments of the present disclosure are directed to removing unwanted plant material via the exhaust port 414, it is noted herein that the unwanted plant material may be removed (e.g., dumped) following an opening of the cover 400. Therefore, the above description should not be interpreted as a limitation on the present disclosure but merely an illustration.

The screening assembly 106 may include a paddle assembly 420 within a seed chamber 422 in the defined cavity 402. The seed chamber may include one or more interior sidewalls 422a and a floor 422b.

The paddle assembly 420 may be configured to rotate about an axis through an axle 424. For example, the orientation of the axle 424 may be approximately perpendicular to the orientation of the axle 202 within the threshing assembly 104. The paddle assembly 420 may include one or more paddle blades 426 coupled to the axle 424.

The paddle assembly 420 may be powered by a motor 428. The motor 428 may be configured to control the speed of rotation of the threshing drum 200. For example, different speeds of rotation may be necessary depending on one or more of a crop type, a crop condition, an environmental condition, and/or the like during harvesting.

The motor 428 may be electric-powered. For example, the electric-powered motor 428 may be powered by a battery pack (e.g., the battery pack 212) onboard the harvester 100. By way of another example, the electric-powered motor 428 may be powered by a battery pack coupled to a user. By way of another example, the electric-powered motor 428 may be powered by a wired power cable.

The motor 428 may be controlled via the toggle 112 in the handle 110. The motor 428 may be exposed. It is noted herein, however, that the motor 428 may be protected by a cover of the housing 102. For example, the cover may be coupled to the housing 102 proximate to the motor 428. By way of another example, the cover may be integrated (e.g., a single component with) a section of the housing 102.

Although embodiments of the present disclosure are directed to the harvester 100, it is noted herein that the paddle assembly 420 may be hand-powered by the user. Therefore, the above description should not be interpreted as a limitation on the present disclosure but merely an illustration.

The paddle assembly 420 and the threshing drum 200 may be configured to operate simultaneously. For example, the threshing drum 200 may be configured to continuously rotate and thresh the grain or seed, while the paddle assembly 420 may be configured to receive the grain or seed (and plant matter) from the threshing drum 200 at the same time.

The screening assembly 106 may include a screen assembly 430 configured to further separate the harvested grain or seed from unwanted plant material. The paddle assembly 420 may be configured to direct the seeds towards the screen assembly 430. For example, the screen assembly 430 may include one or more apertures configured to allow grain or seed sized smaller than a pre-determined threshold to pass through. By way of another example, the screen assembly 430 may include one or more apertures configured to prevent unwanted plant material larger than a pre-determined threshold to pass through.

FIGS. 5A-5H generally illustrate an example embodiment of the screen assembly 430 of the harvester 100, in accordance with one or more embodiments of the present disclosure.

Figure 5A:
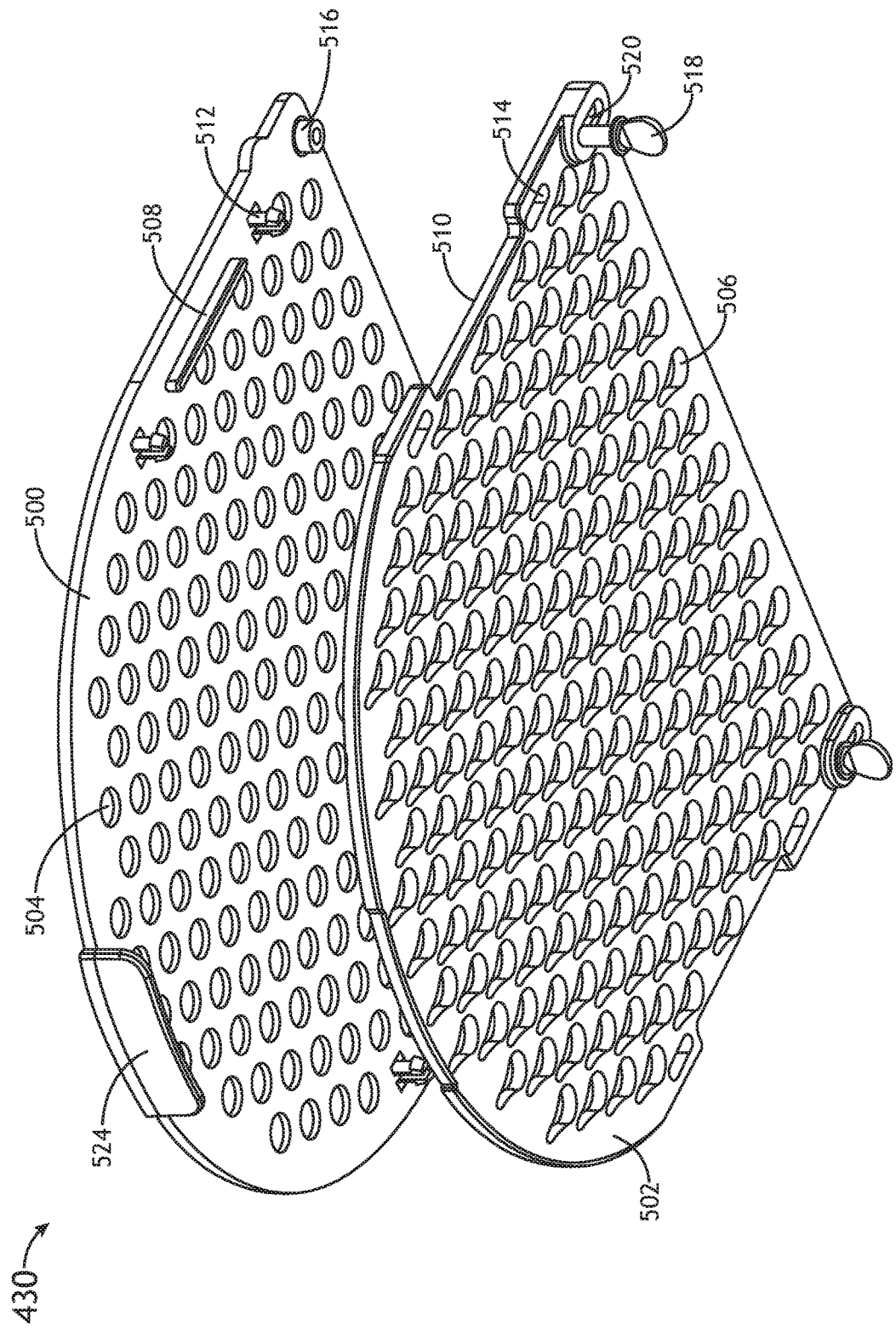
FIG. 5A illustrates an exploded perspective view of the screen assembly, in accordance with one or more embodiments of the present disclosure.
Figure 5B:
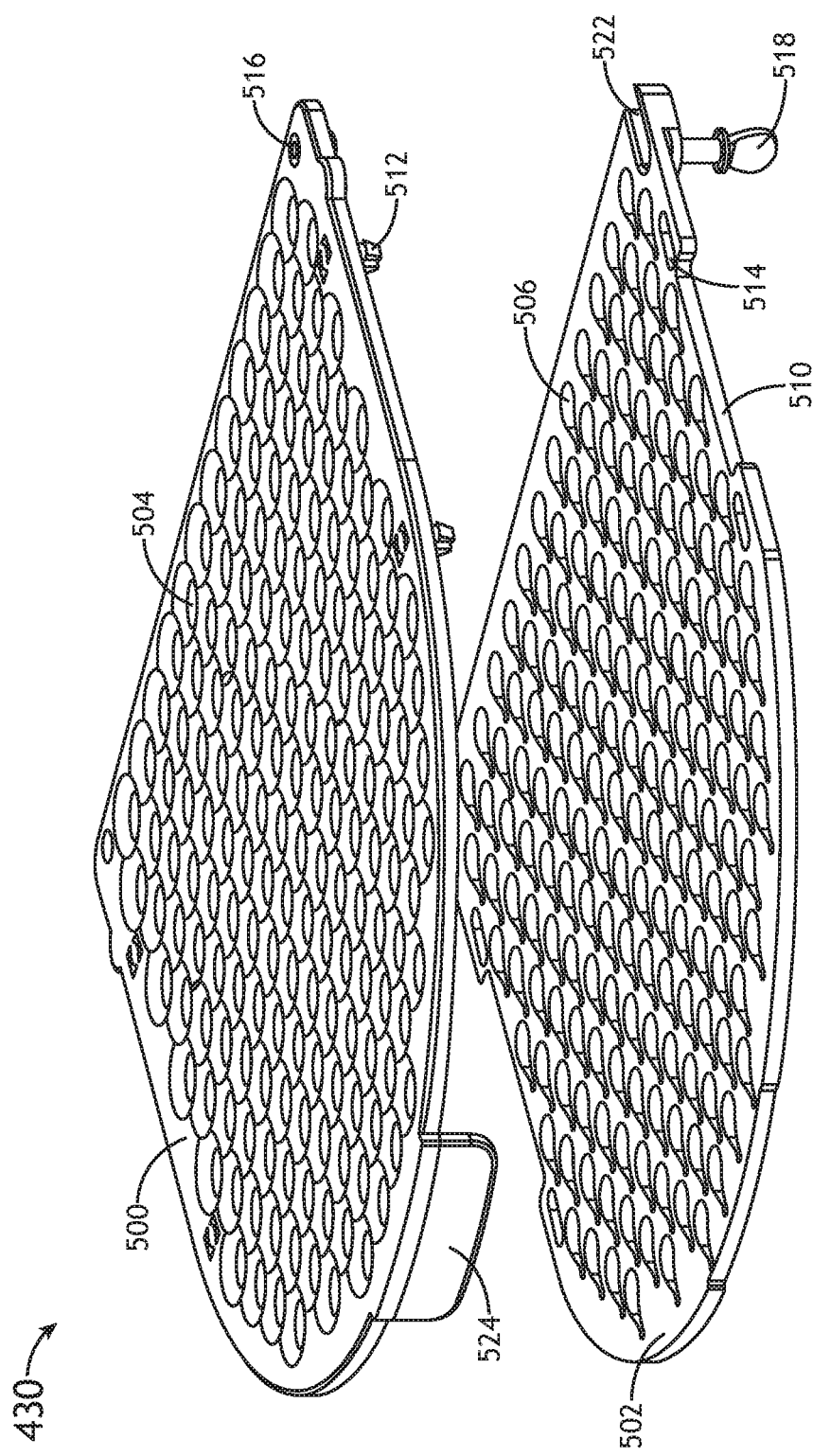
FIG. 5B illustrates an exploded perspective view of the screen assembly, in accordance with one or more embodiments of the present disclosure.
Figure 5C:
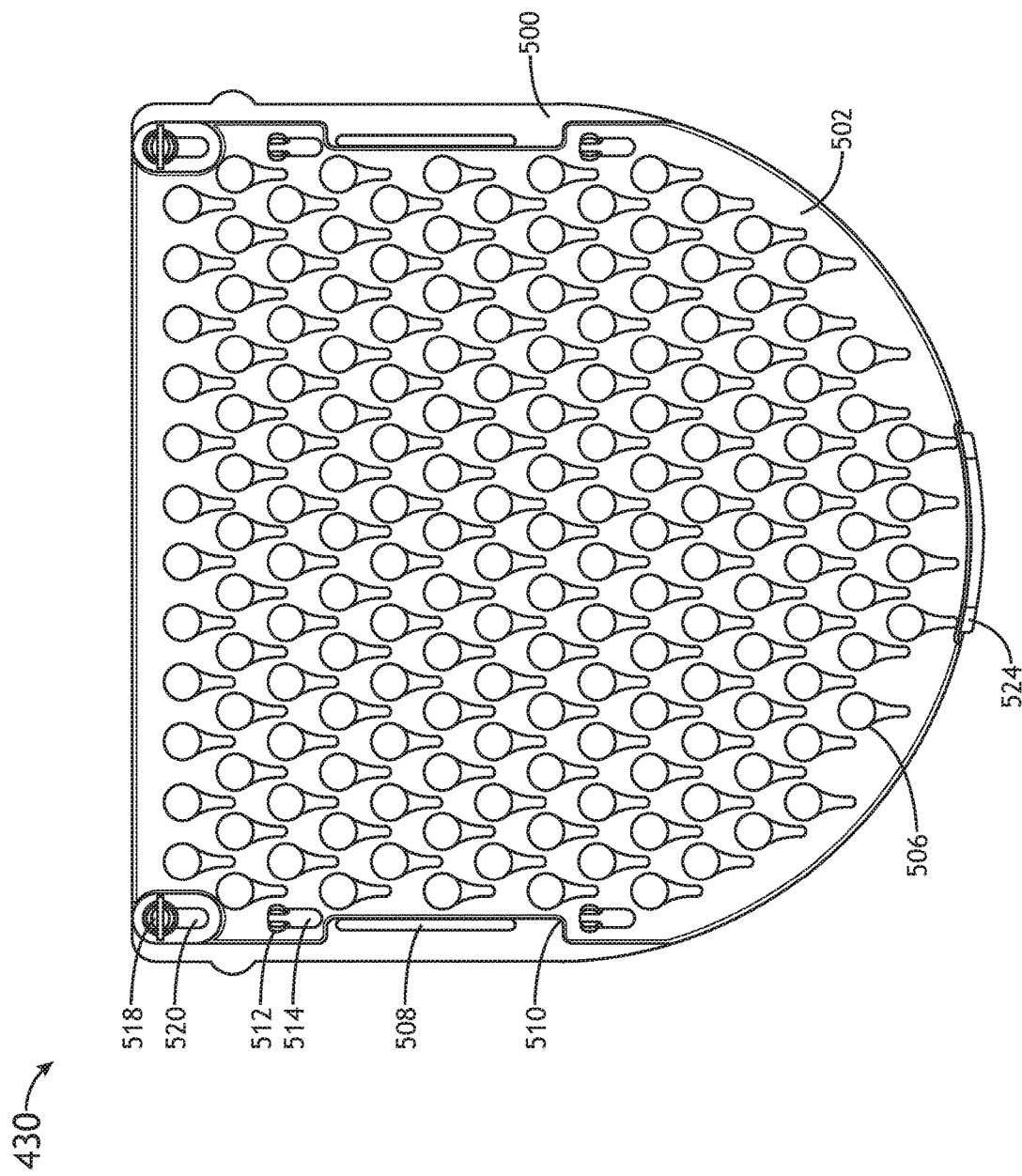
FIG. 5C illustrates a bottom plan view of the screen assembly in an open alignment, in accordance with one or more embodiments of the present disclosure.
Figure 5D:
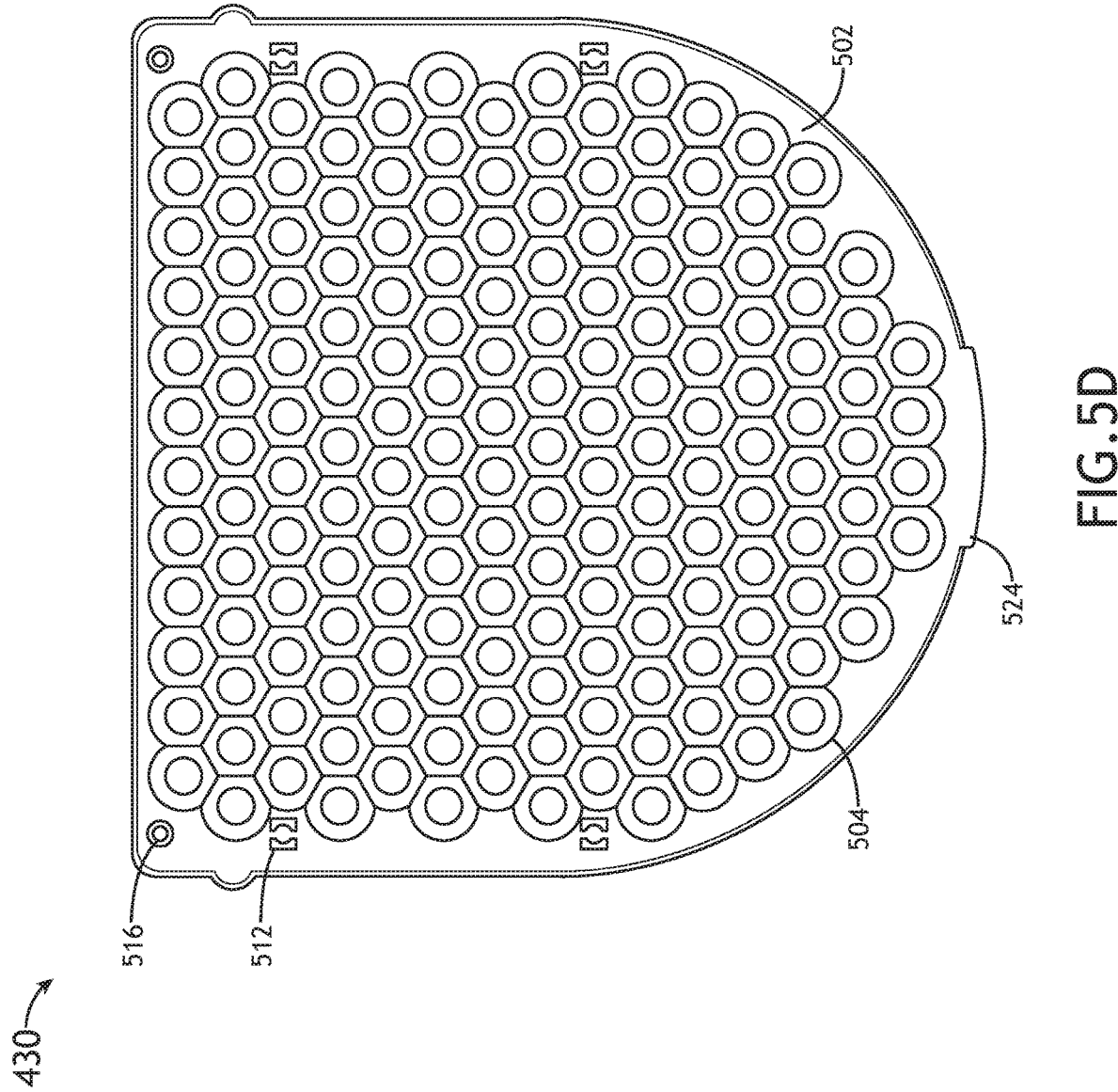
FIG. 5D illustrates a top plan view of the screen assembly in an open alignment, in accordance with one or more embodiments of the present disclosure.
Figure 5F:
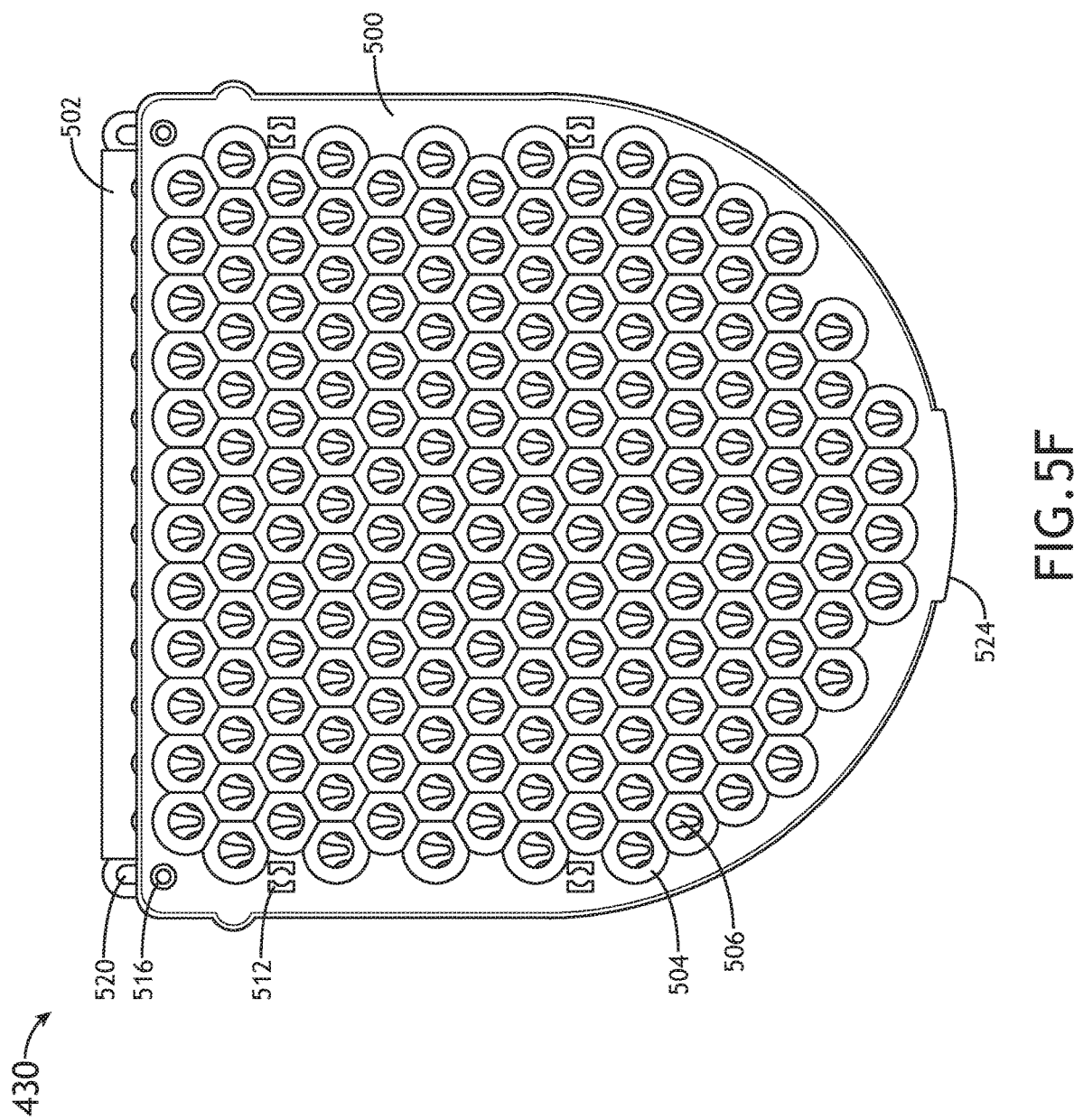
FIG. 5F illustrates a top plan view of the screen assembly in a size and shape-restricted alignment, in accordance with one or more embodiments of the present disclosure.
Figure 5G:
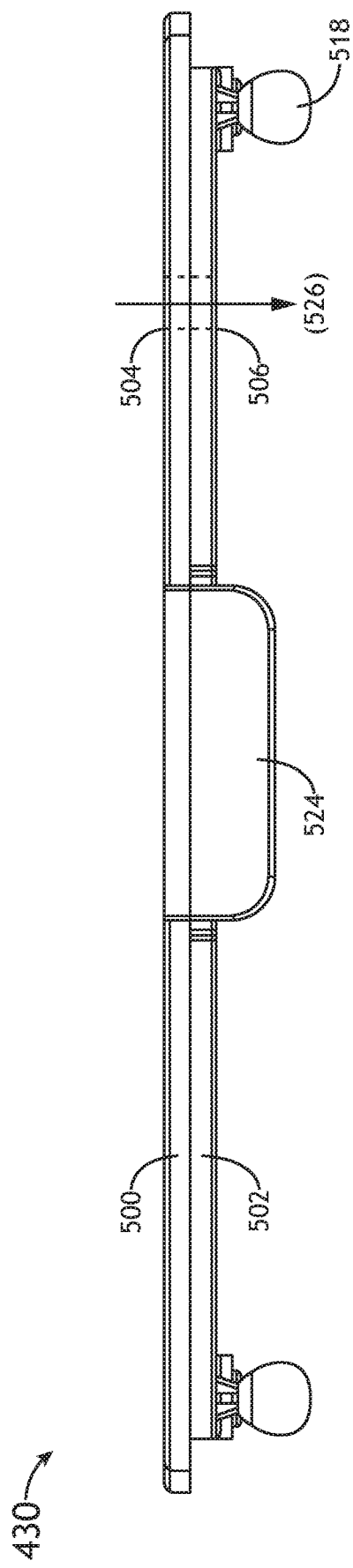
FIG. 5G illustrates a front elevation view of the screen assembly in a size and shape-restricted alignment, in accordance with one or more embodiments of the present disclosure.

It is noted herein that FIGS. 5A and 5B illustrate exploded perspective views of the screen assembly 430. In addition, it is noted herein that FIG. 5C illustrates a bottom plan view of the screen assembly 430 in an open alignment, while FIG. 5D illustrates a top plan view of the screen assembly 430 in the open alignment. Further, it is noted herein that FIG. 5E illustrates a bottom plan view of the screen assembly 430 in a size and shape-restricted alignment, and FIG. 5F illustrates a top plan view of the screen assembly 430 in the size and shape-restricted alignment. Further, it is noted herein that FIG. 5G illustrates a front elevation view of the screen assembly 430 in the size and shape-restricted alignment, and FIG. 5H illustrates a side elevation view of the screen assembly 430 in the size and shape-restricted alignment.

The screen assembly 430 may include a top screen 500 and a bottom screen 502. One or more apertures 504 may be arranged in any pattern and/or arrangement within the top screen 500. One or more apertures 506 may be arranged in any pattern and/or arrangement within the bottom screen 502. The one or more apertures 504 and/or the one or more apertures 506 may include a cross-section of any size and/or shape known in the art having any size and/or shape having any number of sides, up to an N number of curved or straight sides (e.g., the cross-section may be up to an N-sided polygon). For example, the one or more apertures 504 may include, but are not limited to, one or more beveled round apertures. By way of another example, the one or more apertures 506 may include, but are not limited to, one or more non-beveled napiform (e.g., teardrop-shaped) apertures.

It is noted herein that the pattern, arrangement, size, and/or shape of the one or more apertures 504 and/or the one or more apertures 506 may vary depending on a grain or seed type, a crop type, a crop condition, an environmental condition, or the like.

The top screen 500 and the bottom screen 502 may include one or more translation assemblies configured to keep the top screen 500 and the bottom screen 502 coupled together and/or in alignment.

For example, the top screen 500 may include one or more protrusions 508 that may engage one or more corresponding grooves 510 within the bottom screen 502. For instance, the one or more protrusions 508 may track the one or more corresponding grooves 510, preventing the top screen 500 from shifting out of alignment in an axis other than the axis of translation.

By way of another example, the top screen 500 may include one or more tabs 512 that may interlock and slide within one or more corresponding cut-outs 514 in the bottom screen 502. For instance, the one or more tabs may be smooth-bore with a pre-stressed clip to prevent the top screen 500 from separating away from the bottom screen 502 during translation.

By way of another example, the top screen 500 may include one or more threaded receivers 516 for one or more corresponding fasteners 518 (e.g., set screws) in the bottom screen 502. For instance, tightening the one or more fasteners 518 may secure the position of the top screen 500 relative to the bottom screen 502. It is noted herein, however, that the one or more fasteners 518 may pass through one or more corresponding cut-outs 520, such that the top screen 500 may translate relative to the bottom screen 502 when the one or more fasteners 518 are un-tightened.

The top screen 500 may include a handle or lip 524 to assist in translating the top screen 500 relative to the bottom screen 502.

The top screen 500 and the bottom screen 502 may be aligned such that one or more pass-through apertures 526 may be generated by the overlapping one or more apertures 504 and the one or more apertures 506. The top screen 500 may be configured to translate relative to the bottom screen 502. Translation of the top screen 500 may increase or decrease the size and/or shape of the one or more pass-through apertures 526. For example, the one or more pass-through apertures 526 may change from round to oval depending on the amount or degree of adjustment. In this regard, the configuration (e.g., size and/or shape) of the one or more pass-through apertures 526 may allow for the passing of any number of grain or seed including, but not limited to, large-size grain or seed, small-size grain or seed, irregular-shaped grain or seed, oblong-shaped grain or seed, or the like.

It is noted herein that the screen assembly 430 may include pre-defined notches corresponding to particular grain and seed sizes. In addition, it is noted herein the harvester 100 may include a read-out for determining the correct translated position of the top screen 500 relative to the bottom screen 502. For example, the harvester 100 may include size- and/or shape-comparison visual aid markings on an exterior surface of the harvester 100. By way of another example, the harvester 100 may include size- and/or shape-comparison visual aid markings on a surface of the top screen 500 of the screen assembly 430. Further, it is noted herein that the harvester 100 may include any electric components necessary to allow for an electronic adjustment and/or alignment of the top screen 500 relative to the bottom screen 502.

Although FIGS. 5A-5H illustrate screen assembly 430 as including the top screen 500 and the bottom screen 502, it is noted herein that the screen assembly 430 is not limited to two screens. For example, the screen assembly 430 may include a single screen. By way of another example, the screen assembly 430 may include three or more screens. Generally, the number of screens in the screen assembly 430 may vary depending on how clean the grain or seed is after it exits the seed chamber 422. For example, if the grain or seed is generally separate from the unwanted plant material and very little unwanted plant material is present, fewer screens may be required. By way of another example, if more unwanted plant material or other non-grain or seed material is included in the sample after it exits the seed chamber 422, then additional screens may be used. The number and placement of the screens may also vary depending on a crop type, a crop condition, an environmental condition, or the like.

It is noted herein that different types of screens may be inserted (e.g., in terms of aperture pattern, arrangement, size, and/or shape) in the screen assembly 430. In addition, it is noted herein that the different screens may be configured to be easily removable from the screen assembly 430 to allow for operation with fewer screens, more screen, and/or different screens. For example, the different screens may be configured to slide out from the screen assembly 430 in a drawer-like manner.

It is noted herein that different types of different screen assemblies 430 may be inserted within the harvester 100. In addition, it is noted herein that the different screen assemblies 430 may be configured to be easily removable from the harvester 100 to allow for operations with fewer screen assemblies 430, more screen assemblies 430, and/or a different screen assembly 430. For example, the different screen assemblies 430 may be configured to slide out from the harvester 100 in a drawer-like manner.

Referring again to FIGS. 4A-4H, grain or seed may exit through the screen assembly 430 into a top seed compartment 432. The top seed compartment 432 may be configured as a hopper for receiving the grain or seed post-exit from the pass-through apertures 526 (e.g., as illustrated in FIGS. 5A-5H). The top seed compartment 432 may include a tray configured to be easily removable from the harvester 100. The top seed compartment 432 may have a sloped bottom to facilitate movement of the grain or seed from the sides of the top seed compartment 432 downwards. The harvested grain or seed in the top seed compartment 432 may be cleaned and/or used for sampling.

The screening assembly 106 may include a bottom seed compartment 434. The bottom seed compartment 434 may include a seed box 436 configured to receive a sample of the harvested grain or seed. The bottom seed compartment 434 may include a moisture meter 438 configured to measure and/or record the moisture level within the sample of the harvested grain or seed within the seed box 436. The moisture meter 438 may be powered by a battery (e.g., a 9-volt battery, or other battery corresponding to the necessary operating parameters of the moisture meter 438) housed within the bottom seed compartment 434. It is noted herein, however, that the moisture meter 438 may be powered by a battery pack (e.g., the battery pack 212) coupled to the harvester 100.

The screening assembly 106 may include a scale for weighing the grain or seed within the seed box 436. For example, the scale and the moisture meter 438 may be separate measurement devices. By way of another example, the scale and the moisture meter 438 may be components of a single measurement device.

The seed box 436 may include a compression assembly 440 configured to compress the sample of the harvested grain or seed within the seed box 436. For example, the compression assembly 440 may include a plate coupled to a large screw. For instance, the rotation of the large screw may be manually turned with a knob. In addition, the rotation of the large screw may be electrically-driven. It is noted herein that compression of the sample of the harvested grain or seed within the seed box 436 may be necessary to receive an accurate recording of the sample via the moisture meter 438.

The screening assembly 106 may include a moveable plate 442 for emptying at least a portion of the bottom seed compartment 434. For example, the moveable plate 442 may empty the seed box 436 when a hole within the moveable plate 442 is aligned with the seed box 436. The screening assembly 106 may include a moveable plate 444 for filling at least a portion of the bottom seed compartment 434. For example, the moveable plate 444 may fill the seed box 436 when a hole within the moveable plate 444 is aligned with the seed box 436. The moveable plate 442 and/or the moveable plate 444 may be rotatable about an axis through the center of the bottom seed compartment 434.

A floor of the top seed compartment 432 may be configured (e.g., sloped) to channel harvested grain or seed out of the top seed compartment 432 and into the bottom grain compartment 434. For example, the harvested grain or seed may be channeled into the seed box 436 via the hole within the moveable plate 444. It is noted herein, however, that the harvester 100 may be constructed such that the screen assembly 430 may exit directly into the seed box 436 via the hole within the moveable plate 444, such that the top seed compartment 432 is not necessary.

It is noted herein that any of the top seed compartment 432, the bottom seed compartment 434, or the seed box 436 may be considered a collection chamber, for purposes of the present disclosure.

The cover 400 may include an opening 446. Control levers for the moveable plate 442 and/or the moveable plate 444 may pass through the opening 446, such that a user is able to actuate the moveable plate 442 and/or actuate the moveable plate 444 without opening the cover 404 of the housing 102.

The threshing assembly may include a bracket 448. A user interface 450 communicatively coupled to the moisture meter 438 may be coupled to the bracket 448. The user interface 450 may include one or more displays 452. The user interface 450 may include one or more user inputs 454. The user interface 450 may include one or more processors and memory, where the memory is configured to store one or more sets of program instructions, where the one or more processors are configured to execute the one or more sets of program instructions. It is noted herein that the user interface 450 may be communicatively coupled to other sensors, power circuits, or the like throughout the harvester 100 in addition to the moisture meter 438.

The harvester 100 may include Global Positioning System (GPS) hardware and software configured to record location details. For example, the GPS hardware and software may record details of where samples have been taken. The harvester 100 may include a computer processor and memory configured to record data and to match the data with location data from the GPS hardware and software.

Figure 6:
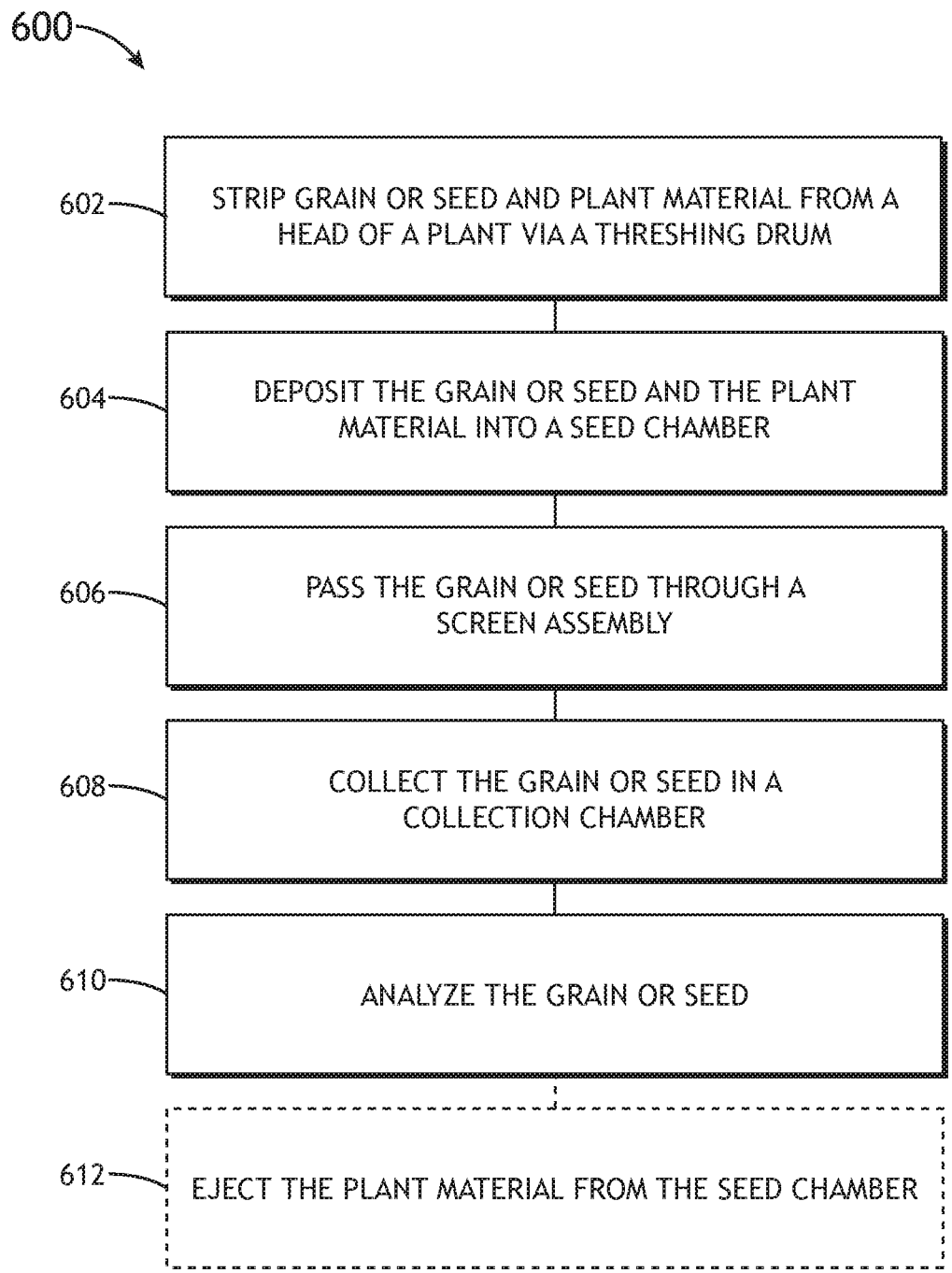
FIG. 6 illustrates a flow diagram of a method for harvesting with a handheld harvester apparatus, in accordance with one or more embodiments of the present disclosure.

FIG. 6 illustrates a method 600 for harvesting with the handheld harvester apparatus 100, in accordance with one or more embodiments of the present disclosure. It is noted herein the method 600 is not limited to the steps and/or sub-steps provided. For example, the method 600 may instead include more or fewer steps and/or sub-steps. By way of another example, the method 600 may perform the steps and/or sub-steps in an order other than provided. Therefore, the above description should not be interpreted as a limitation on the scope of the present disclosure, but merely an illustration.

In a step 602, grain or seed and plant material is stripped from a head of a plant via a threshing drum. The rotation of the threshing drum 200 of the harvester 100 may collect the grain or seed and the plant material by stripping it from the head of the plant. For example, the teeth 206 and/or the gaps 208 of the one or more blades 204 of the threshing drum 200 may at least partially strip the head of the plant.

In a step 604, the grain or seed and the plant material is deposited into a seed chamber. The rotation of the threshing drum 200 may deposit the grain or seed and the plant material into the seed chamber 422 after the grain or seed and the plant material is stripped from the head of the plant.

In a step 606, the grain or seed is passed through a screen assembly. In a step 608, the grain or seed is collected in a collection chamber. The paddle assembly 420 may be configured to direct the seeds towards the screen assembly 430. The screen assembly 430 may be configured to function with the paddle assembly 420 installed in the seed chamber 422. For example, a combination of one or more of the rotational speed (e.g., in rotations per minute, or RPMs) of the paddle assembly 420, the shape and/or texture (e.g., ribbing) 426a of the one or more paddle blades 426, the texture (e.g., ribbing) of the one or more interior sidewalls 422a of the seed chamber 422, and/or the design of the floor 422b of the seed chamber 422 may assist in cleaning and separating any unwanted plant material from the grain or seed. For example, texturing the one or more paddle blades 426 and/or the interior sidewalls 422a with ribs (e.g., ribs 426a) may increase a cleaning surface area within the seed chamber 422 and reduce the cleaning time. Grain or seed falling to the floor 422b of the seed chamber 422 will settle into the concave depressions of the screen assembly 430 (e.g., the apertures 502 of the top screen 500) and pass through into the top seed compartment 432. It is noted herein that any of the top seed compartment 432, the bottom seed compartment 434, or the seed box 436 may be considered a collection chamber, for purposes of the present disclosure.

In a step 610, the grain or seed may be analyzed. Moisture content of the grain or seed may be analyzed via the moisture meter 438. Grain or seed within the top seed compartment 432 may be channeled into the bottom seed compartment 434. For example, the grain or seed may be channeled into the seed box 436. For instance, the grain or seed may be channeled into the seed box 436 via the moveable plate 444. The analyzed grain or seed may be emptied from the bottom seed compartment 434 via the moveable plate 442. For example, the grain or seed may be emptied from the seed box 436 via the moveable plate 444.

In a step 612, the plant material may be ejected from the seed chamber. The paddle assembly 420 may optionally be configured to eject at least some of the plant matter from the harvester 100. Turbulent, positive air pressure on the advancing side of the paddle blades 426 while passing over the screen depressions of the screen assembly 430 may push unwanted plant material forward and outward. Cavitation (e.g., formation of a vacuum) on the retreating side of the paddle blades 426 while passing over the screen depressions of the screen assembly 430 may lift unwanted plant material to be removed from the harvester 100 (e.g., via the exhaust port 414).

It is noted herein that the positive air pressure and the vacuum may only be generated and/or maintained due to select tolerances of the spacing between the one or more paddle blades 426 and the one or more interior sidewalls 422a of the seed chamber 422, which may result in a better, more constructive air flow. In addition, it is noted herein that the positive air pressure and the vacuum may only be generated and/or maintained due to select tolerances of the spacing between the one or more paddle blades 426 and the screen assembly 430. Further, it is noted herein that the positive air pressure and the vacuum may only be generated and/or maintained due to the variable rotational speed of the one or more paddle blades 426.

It is noted herein that the paddle assembly 420 may include a spacing having a select tolerance between the interior sidewalls 422a of the seed chamber 422 and/or the screen assembly 430 to generate areas of turbulent, positive air pressure and cavitation to help lift and remove unwanted plant material (e.g., out of the exhaust port 414). It is noted herein, however, that the harvester 100 may include a fan that assists the paddle assembly 420 in generating the positive pressure and vacuum to facilitate the removal and ejection of unwanted plant material, while allowing the grain or seed to remain in the screening assembly 106. For example, the speed of the fan may be adjusted depending on a crop type, a crop condition, an operating condition, an environmental condition, or the like.

The handheld harvester apparatus of the present disclosure includes several advantages. First, the handheld harvester apparatus of the present disclosure may produce seed samples that are very clean and suitable for testing instrumentation. In addition, these samples may be produced quickly and on-site.

Second, the handheld harvester apparatus of the present disclosure may be configured to simultaneously eject unwanted plant material while the threshing drum is threshing, resulting in a highly efficient operation and allowing harvesting to occur with limited or no down time due to removal of unwanted plant material from the handheld harvester apparatus. This continuous operation of the handheld harvester apparatus may allow a user to be relatively passive during harvesting, without the need to operate multiple components of the handheld harvester apparatus, simplifying the learning curve for operators.

Third, the handheld harvester apparatus is highly efficient at removing unwanted plant material and additional processing of the seeds may not be required after the screening step. For example, up to 90% of all unwanted plant material may be removed from the seed sample.

Fourth, the handheld harvester apparatus may include interchangeable components to accommodate different crop types. For example, the size and/or shape of pass-through apertures within a screen assembly may be adjustable.

Fifth, the handheld harvester apparatus may be easily adjusted and manipulated for efficient harvesting. For example, the handheld harvester apparatus may be angled and adjusted during use by the user to allow for more effective harvesting.

Sixth, the harvester may have a range of applications. For example, the handheld harvester apparatus may be useful in obtaining grain samples for crops in a large field at several locations without the need for using heavy agricultural machinery. In addition, the handheld harvester apparatus may be useful for harvesting crops for small operations, such as gardens.

As such, advantages of the present disclosure are directed to a handheld harvester apparatus configured for operation by a single operator to collect grain or seed and separate the grain or seed from unwanted plant material at a variety of locations.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components.

In some instances, one or more components may be referred to herein as "configured to," "configurable to," "operable/operative to," "adapted/adaptable," "able to," "conformable/conformed to," or the like. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," or the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, or the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, or the like). In those instances where a convention analogous to "at least one of A, B, or C, or the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, or the like). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed:

1. A handheld harvester apparatus, comprising:
    a threshing assembly, comprising:
        a threshing drum configured to rotate about a first axle, the threshing drum including a plurality of blades coupled to the first axle, a blade of the plurality of blades including a set of teeth configured to strip a plurality of seeds and plant material from a head of a plant;
    a screening assembly, comprising:
        a paddle assembly configured to receive the plurality of seeds and plant material from the threshing assembly, the paddle assembly configured to rotate about a second axle, the paddle assembly including a plurality of paddles coupled to the second axle;
        a screen assembly positioned beneath the paddle assembly, the screen assembly comprising:
            a top screen including a first plurality of apertures, the top screen configured to receive the plurality of seeds from the paddle assembly;
            a bottom screen including a second plurality of apertures, the bottom screen positioned beneath the top screen, the top screen configured to translate relative to the bottom screen; and
            a plurality of pass-through apertures configured to define a threshold for at least one of a size or shape of a seed of the plurality of seeds, a pass-through aperture of the plurality of pass-through apertures defined by an overlapping top aperture of the first plurality of apertures and a bottom aperture of the second plurality of apertures, wherein the top screen translates relative to the bottom screen causes a change of size or a change of shape of the one or more pass-through apertures; and
        a collection chamber positioned beneath the screen assembly, the collection chamber configured to receive a seed of the plurality of seeds that exits a pass-through aperture of the plurality of pass-through apertures; and
    a housing configured to house at least a portion of the threshing assembly and at least a portion of the screening assembly.

2. The apparatus of claim 1, the screening assembly further comprising:
    a seed chamber comprising one or more interior sidewalls and the paddle assembly, the threshing drum configured to provide the plurality of seeds and plant material to the seed chamber.

3. The apparatus of claim 2, the seed chamber further comprising:
    a floor, the screen assembly positioned beneath the floor of the seed chamber.

4. The apparatus of claim 3, at least one of the one or more interior sidewalls or the plurality of paddles of the paddle assembly including a plurality of ribs, the plurality of ribs configured to clean the plant material from the plurality of seeds prior to transfer to the screen assembly.

5. The apparatus of claim 4, further comprising:
    a cover of the housing, at least one of the paddle assembly or the collection chamber being accessible via the cover.

6. The apparatus of claim 5, further comprising:
    an exhaust port within the cover, the paddle assembly configured to eject the plant material out through the exhaust port during rotation of the paddle assembly.

7. The apparatus of claim 6, the ejecting of the plant material during rotation of the paddle assembly caused by at least one of a select turbulent air pressure or cavitation within the seed chamber.

8. The apparatus of claim 7, the spacing between the plurality of blades of the paddle assembly and the one or more interior sidewalls including a select tolerance to at least one of generate the select turbulent air pressure or cause the cavitation within the seed chamber.

9. The apparatus of claim 7, the spacing between the plurality of blades of the paddle assembly and the screen assembly including a select tolerance to at least one of generate the select turbulent air pressure or cause the cavitation within the seed chamber.

10. The apparatus of claim 6, at least one of a shape or a size of the exhaust port being adjustable via the exhaust door translating within a set of grooves on the cover.

11. The apparatus of claim 10, further comprising:
    an interlocking assembly between the exhaust door and the cover, the at least one of the shape or the size of the exhaust port being set by the interlocking assembly.

12. The apparatus of claim 1, the second axle of the paddle assembly being oriented generally perpendicular to the first axle of the threshing drum.

13. The apparatus of claim 1, the threshing assembly further comprising:
    one or more stationary blades including a set of teeth, the set of teeth of the blade of the plurality of blades configured to pass through a gap between adjacent teeth of the set of teeth of the one or more stationary blades during rotation of the threshing drum.

14. The apparatus of claim 1, further comprising:
    a handle including a toggle, the toggle configured to control power to at least one of a first motor coupled to the first axle of the threshing drum or a second motor coupled to the second axle of the paddle assembly.

15. The apparatus of claim 14, the threshing drum configured to operate simultaneously with the paddle assembly when the toggle is engaged.

16. The apparatus of claim 1, the collection chamber including a seed box, the seed box including a moisture meter configured to measure moisture levels of the seed of the plurality of seeds that exits the pass-through aperture of the plurality of pass-through apertures, the moisture meter coupled to a user interface.

17. The apparatus of claim 1, wherein the pass-through aperture of the plurality of pass-through apertures has a round shape.

18. The apparatus of claim 1, wherein the pass-through aperture of the plurality of pass-through apertures has an oval shape.

19. The apparatus of claim 1, wherein the second plurality of apertures are teardrop-shaped apertures.

20. A handheld harvester apparatus, comprising:
  a threshing assembly, comprising:
    a threshing drum configured to rotate about a first axle, the threshing drum including a plurality of blades coupled to the first axle, a blade of the plurality of blades including a set of teeth configured to strip a plurality of seeds and plant material from a head of a plant;
  a screening assembly, comprising:
    a paddle assembly configured to receive the plurality of seeds and plant material from the threshing assembly, the paddle assembly configured to rotate about a second axle, the paddle assembly including a plurality of paddles coupled to the second axle; and
    a seed chamber comprising one or more interior sidewalls and the paddle assembly, the threshing drum configured to provide the plurality of seeds and plant material to the seed chamber;
    a screen assembly positioned beneath the paddle assembly, the screen assembly comprising:
      a top screen including a first plurality of apertures, the top screen configured to receive the plurality of seeds from the paddle assembly;
      a bottom screen including a second plurality of apertures, the bottom screen positioned beneath the top screen, the top screen configured to translate relative to the bottom screen; and
      a plurality of pass-through apertures configured to define a threshold for at least one of a size or shape of a seed of the plurality of seeds, a pass-through aperture of the plurality of pass-through apertures defined by an overlapping top aperture of the first plurality of apertures and a bottom aperture of the second plurality of apertures; and
    a collection chamber positioned beneath the screen assembly, the collection chamber configured to receive a seed of the plurality of seeds that exits a pass-through aperture of the plurality of pass-through apertures; and
  a housing configured to house at least a portion of the threshing assembly and at least a portion of the screening assembly, wherein the seed chamber further includes a floor and the screen assembly is positioned beneath the floor of the seed chamber, wherein at least one of the one or more interior sidewalls or the plurality of paddles of the paddle assembly including a plurality of ribs, the plurality of ribs configured to clean the plant material from the plurality of seeds prior to transfer to the screen assembly.

* * * * *